United States Patent
Cha et al.

(10) Patent No.: US 12,396,022 B2
(45) Date of Patent: Aug. 19, 2025

(54) METHOD FOR TRANSMITTING AND RECEIVING SIGNAL IN WIRELESS COMMUNICATION SYSTEM, AND APPARATUS SUPPORTING SAME

(71) Applicant: LG ELECTRONICS INC., Seoul (KR)

(72) Inventors: Hyunsu Cha, Seoul (KR); Kijun Kim, Seoul (KR); Sukhyon Yoon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 553 days.

(21) Appl. No.: 17/634,904

(22) PCT Filed: Aug. 13, 2020

(86) PCT No.: PCT/KR2020/010716
§ 371 (c)(1),
(2) Date: Feb. 11, 2022

(87) PCT Pub. No.: WO2021/029683
PCT Pub. Date: Feb. 18, 2021

(65) Prior Publication Data
US 2022/0338203 A1    Oct. 20, 2022

(30) Foreign Application Priority Data
Aug. 13, 2019   (KR) .................. 10-2019-0099054

(51) Int. Cl.
*H04W 72/542* (2023.01)
*H04L 5/00* (2006.01)
*H04W 64/00* (2009.01)

(52) U.S. Cl.
CPC ......... *H04W 72/542* (2023.01); *H04L 5/0048* (2013.01); *H04W 64/00* (2013.01)

(58) Field of Classification Search
CPC ..... H04W 72/542; H04W 24/10; H04W 4/02; H04W 4/023–029; H04L 5/0048; H04L 5/0057; G01S 5/0036; H04B 17/309
See application file for complete search history.

(56) References Cited

U.S. PATENT DOCUMENTS

| | | | |
|---|---|---|---|
| 10,327,109 B1 * | 6/2019 | Maheshwari | H04W 4/029 |
| 2011/0207477 A1 * | 8/2011 | Siomina | G01S 5/0244 |
| | | | 455/67.11 |

(Continued)

FOREIGN PATENT DOCUMENTS

| KR | 1020160081984 | 7/2016 |
|---|---|---|
| KR | 1020190002439 | 1/2019 |

OTHER PUBLICATIONS

3rd Generation Partnership Project (3GPP), "Technical Specification Group Services and System Aspects; Study on positioning use cases; Stage 1, (Release 16)," 3GPP TR 22.872 V16.1.0, Sep. 2018, 77 pages.

(Continued)

*Primary Examiner* — Ricky Q Ngo
*Assistant Examiner* — David M Kayal
(74) *Attorney, Agent, or Firm* — LEE, HONG, DEGERMAN, KANG & WAIMEY

(57) ABSTRACT

Various embodiments of the present disclosure relate to a next generation wireless communication system supporting a higher data transmission rate than a 4th generation (4G) wireless communication system. According to various embodiments of the present disclosure, provided may be a method for transmitting and receiving a signal in a wireless communication system, and an apparatus supporting same.

10 Claims, 26 Drawing Sheets

(56) References Cited

U.S. PATENT DOCUMENTS

| | | | |
|---|---|---|---|
| 2013/0190006 A1* | 7/2013 | Kazmi | H04W 64/006 455/456.1 |
| 2014/0087754 A1* | 3/2014 | Siomina | H04W 4/02 455/456.1 |
| 2015/0087338 A1* | 3/2015 | Kazmi | H04B 17/382 455/456.1 |
| 2016/0127871 A1* | 5/2016 | Smith | H04W 4/02 455/456.6 |
| 2016/0278040 A1 | 9/2016 | Siomina | |
| 2022/0330198 A1* | 10/2022 | Ren | H04W 64/006 |

OTHER PUBLICATIONS

LG Electronics Mobile Research, "Clarification on consolidated potential requirements appliable to V2X," 3GPP TSG-SA WG1 Meeting#83, West Palm Beach, Florida, S1-182601, Aug. 2018, 6 pages.

PCT International Application No. PCT/KR2020/010716, Written Opinion of the International Searching Authority dated Nov. 20, 2020, 10 pages.

* cited by examiner

FIG. 13
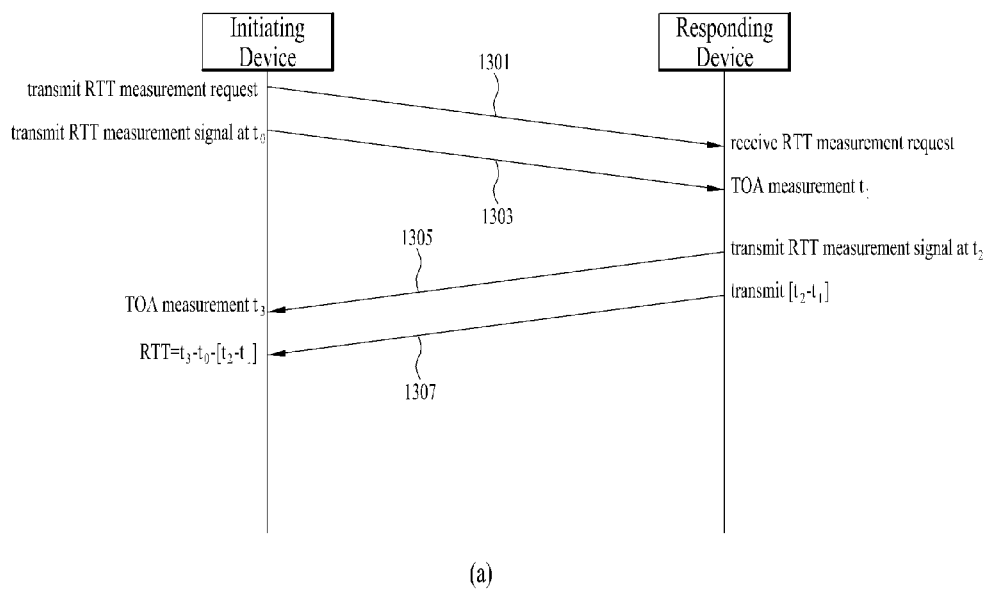
(a)
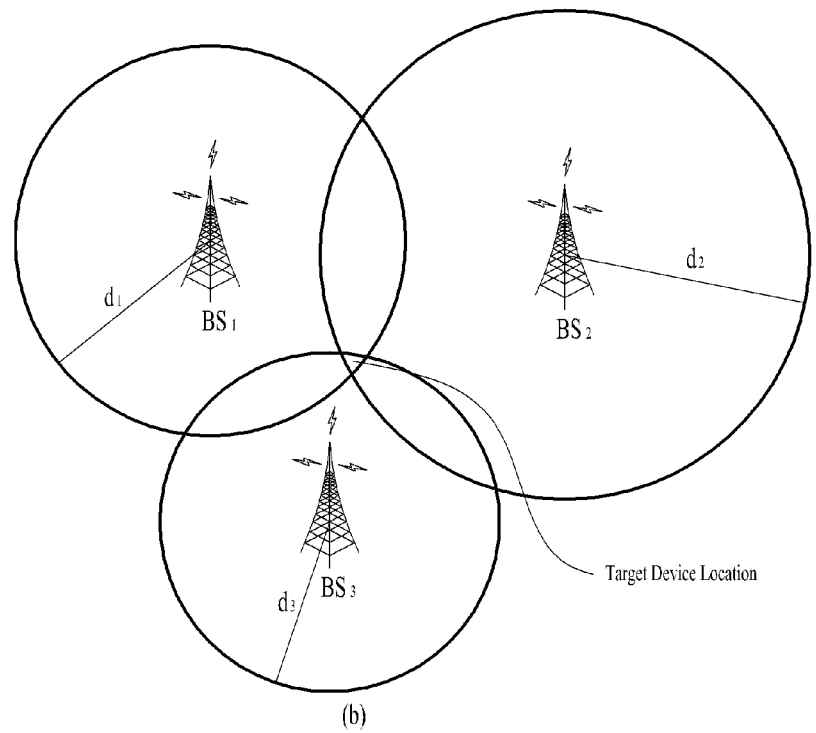
(b)

METHOD FOR TRANSMITTING AND RECEIVING SIGNAL IN WIRELESS COMMUNICATION SYSTEM, AND APPARATUS SUPPORTING SAME

CROSS-REFERENCE TO RELATED APPLICATIONS

This application is the National Stage filing under 35 U.S.C. 371 of International Application No. PCT/KR2020/010716, filed on Aug. 13, 2020, which claims the benefit of earlier filing date and right of priority to Korean Application No. 10-2019-0099054, filed on Aug. 13, 2019, the contents of which are all incorporated by reference herein in their entirety.

TECHNICAL FIELD

Various embodiments of the present disclosure relate to a wireless communication system.

BACKGROUND ART

As a number of communication devices have required higher communication capacity, the necessity of the mobile broadband communication much improved than the existing radio access technology (RAT) has increased. In addition, massive machine type communications (MTC) capable of providing various services at anytime and anywhere by connecting a number of devices or things to each other has been considered in the next generation communication system. Moreover, a communication system design capable of supporting services/UEs sensitive to reliability and latency has been discussed.

DISCLOSURE

Technical Problem

Various embodiments of the present disclosure may provide a method and apparatus for transmitting and receiving a signal in a wireless communication system, and an apparatus for supporting the same.

For example, various embodiments of the present disclosure may provide a positioning method in a wireless communication system, and an apparatus for supporting the same.

For example, various embodiments of the present disclosure may provide a positioning method in a wireless communication system in which reliability (or confidence) is further considered during measurement quality reporting of a measurement value for positioning, and an apparatus for supporting the same.

For example, various embodiments of the present disclosure may provide a positioning method in a wireless communication system that allows a relative measurement quality to be reported during measurement quality reporting of a measurement value for positioning, and an apparatus for supporting the same.

For example, various embodiments of the present disclosure may provide a positioning method in a wireless communication system that allows absolute measurement quality and relative measurement quality to be reported in accordance with the capabilities of a wireless communication system, and an apparatus for supporting the same.

It will be appreciated by persons skilled in the art that the objects that could be achieved with the various embodiments of the present disclosure are not limited to what has been particularly described hereinabove and the above and other objects that the various embodiments of the present disclosure could achieve will be more clearly understood from the following detailed description.

Technical Solutions

Various embodiments of the present disclosure may provide a method and apparatus for transmitting and receiving a signal in a wireless communication system.

In accordance with an aspect of the present disclosure, a method to be performed by a user equipment (UE) in a wireless communication system is provided.

In an exemplary embodiment, a method performed by a user equipment (UE) in a wireless communication system includes: receiving first configuration information related to a reference signal (RS) resource for positioning; receiving second configuration information related to a report for the positioning; acquiring a measurement for the positioning based on the first configuration information; and transmitting information related to a quality of the measurement based on the second configuration information.

In an exemplary embodiment, the second configuration information includes information for configuring a confidence for the quality.

In an exemplary embodiment, the information for configuring the confidence includes at least one bit.

In an exemplary embodiment, one of a plurality of predetermined confidences is instructed based on the at least one bit.

In an exemplary embodiment, the at least one bit having a first value is mapped to a first confidence from among the plurality of predetermined confidences.

In an exemplary embodiment, the at least one bit having a second value is mapped to a second confidence from among the plurality of predetermined confidences.

In an exemplary embodiment, the information for configuring the confidence includes: a bit string having a size of 2 bits.

In an exemplary embodiment, the bit string having a value of '00' is mapped to a confidence of 80 percent.

In an exemplary embodiment, the bit string having a value of '01' is mapped to a confidence of 85 percent.

In an exemplary embodiment, the bit string having a value of '10' is mapped to a confidence of 90 percent.

In an exemplary embodiment, the bit string having a value of '11' is mapped to a confidence of 95 percent.

In an exemplary embodiment, based on a state in which the confidence of the quality of the measurement does not guarantee confidence that is configured based on the confidence configuration information, the information related to the quality of the measurement includes information about the number of measurement samples used to determine the quality of the measurement.

In an exemplary embodiment, based on a state in which the confidence of the quality of the measurement guarantees confidence that is configured based on the confidence configuration information, the information related to the quality of the measurement does not include information about the number of measurement samples used to determine the quality of the measurement.

In an exemplary embodiment, the quality of the measurement is an absolute quality of the measurement.

In an exemplary embodiment, the method further includes: based on a state in which capability related to signaling overhead of the wireless communication system is less than a predetermined level, (i) transmitting information related to a relative quality of the measurement based on the second configuration information; and (ii) dropping transmission of information related to the absolute quality of the measurement.

In an exemplary embodiment, the information related to the relative quality of the measurement includes at least one of: (i) information about an average quality of a plurality of measurements that are obtained from a plurality of transmission points (TPs), a plurality of reference signal (RS) resource sets, or a plurality of RS resources; (ii) information about an identifier (ID) of the transmission point (TP), an ID of the RS resource set, or an ID of the RS resource, which correspond to a measurement having an upper X percent or an upper Y percent from among the plurality of measurements obtained from the plurality of TPs, the plurality of RS resource sets, or the plurality of RS resources; or (iii) information about IDs of the plurality of TPs, IDs of the plurality of RS resource sets, and IDs of the plurality of RS resources, that are sequentially arranged in a range from an ID of the transmission point (TP), an ID of the RS resource set, and an ID of the RS resource, each of which corresponds to a measurement having a best quality from among the plurality of measurements obtained from the plurality of TPs, the plurality of RS resource sets, or the plurality of RS resources, to an ID of the transmission point (TP), an ID of the RS resource set, and an ID of the RS resource, each of which corresponds to a measurement having a worst quality from among the plurality of obtained measurements, In an exemplary embodiment, X is a natural number, and Y is a real number.

In accordance with another aspect of the present disclosure, an apparatus operating in a wireless communication system is provided.

In an exemplary embodiment, the apparatus may include a memory; and at least one processor connected to the memory.

In an exemplary embodiment, the at least one processor is configured to: receive first configuration information related to a reference signal (RS) resource for positioning; receive second configuration information related to a report for the positioning; acquire a measurement for the positioning based on the first configuration information; and transmit information related to a quality of the measurement based on the second configuration information.

In an exemplary embodiment, the second configuration information includes information for configuring a confidence for the quality.

In an exemplary embodiment, the information for configuring the confidence includes at least one bit.

In an exemplary embodiment, one of a plurality of predetermined confidences is instructed based on the at least one bit.

In an exemplary embodiment, the at least one bit having a first value is mapped to a first confidence from among the plurality of predetermined confidences.

In an exemplary embodiment, the at least one bit having a second value is mapped to a second confidence from among the plurality of predetermined confidences.

In an exemplary embodiment, the information for configuring the confidence includes: a bit string having a size of 2 bits.

In an exemplary embodiment, the bit string having a value of '00' is mapped to a confidence of 80 percent.

In an exemplary embodiment, the bit string having a value of '01' is mapped to a confidence of 85 percent.

In an exemplary embodiment, the bit string having a value of '10' is mapped to a confidence of 90 percent.

In an exemplary embodiment, the bit string having a value of '11' is mapped to a confidence of 95 percent.

In an exemplary embodiment, based on a state in which the confidence of the quality of the measurement does not guarantee confidence that is configured based on the confidence configuration information, the information related to the quality of the measurement includes information about the number of measurement samples used to determine the quality of the measurement.

In an exemplary embodiment, based on a state in which the confidence of the quality of the measurement guarantees confidence that is configured based on the confidence configuration information, the information related to the quality of the measurement does not include information about the number of measurement samples used to determine the quality of the measurement.

In an exemplary embodiment, the apparatus is configured to communicate with at least one of a mobile terminal, a network, and an autonomous vehicle other than a vehicle including the apparatus.

In accordance with another aspect of the present disclosure, an apparatus operating in a wireless communication system is provided.

In an exemplary embodiment, the apparatus includes at least one processor; and at least one memory configured to store instructions such that the at least one processor performs specific operations by executing the instructions.

In an exemplary embodiment, the specific operations include: receiving first configuration information related to a reference signal (RS) resource for positioning; receiving second configuration information related to a report for the positioning; acquiring a measurement for the positioning based on the first configuration information; and transmitting information related to a quality of the measurement based on the second configuration information.

In an exemplary embodiment, the second configuration information includes information for configuring a confidence for the quality.

In accordance with another aspect of the present disclosure, a processor-readable medium configured to store at least one instruction that allows at least one processor to perform specific operations by executing the instructions is provided.

In an exemplary embodiment, the processor-readable medium may perform the specific operations, wherein the specific operations include: receiving first configuration information related to a reference signal (RS) resource for positioning; receiving second configuration information related to a report for the positioning; acquiring a measurement for the positioning based on the first configuration information; and transmitting information related to a quality of the measurement based on the second configuration information.

In an exemplary embodiment, the second configuration information includes information for configuring a confidence for the quality.

Various embodiments as described above are only some of preferred embodiments of the various embodiments, and those skilled in the art may derive and understand many embodiments in which technical features of the various embodiments are reflected based on the following detailed description.

Advantageous Effects

Various embodiments of the present disclosure may provide a method for transmitting and receiving signals in a wireless communication system, and an apparatus for supporting the same.

For example, various embodiments of the present disclosure may provide a positioning method in a wireless communication system and an apparatus for supporting the same.

For example, various embodiments of the present disclosure may provide a method for transmitting and receiving a signal in a wireless communication system in which confidence is further considered during measurement quality reporting of a measurement value for positioning so as to increase accuracy, and an apparatus for supporting the same.

For example, various embodiments of the present disclosure may provide a positioning method in a wireless communication system capable of reducing signaling overhead by reporting a relative measurement quality when reporting the measurement quality of a measurement value for positioning, and an apparatus for supporting the same.

For example, various embodiments of the present disclosure may provide a positioning method in a wireless communication system capable of performing efficient positioning by reporting an absolute measurement quality and a relative measurement quality according to the capabilities of the wireless communication system, and an apparatus for supporting the same.

It will be appreciated by persons skilled in the art that the effects that can be achieved with the various embodiments are not limited to what has been particularly described hereinabove and other advantages of the various embodiments will be more clearly understood from the following detailed description taken in conjunction with the accompanying drawings.

DESCRIPTION OF DRAWINGS

The accompanying drawings, which are included to provide a further understanding of the various embodiments of the present disclosure, provide the various embodiments of the present disclosure together with detail explanation. Yet, a technical characteristic the various embodiments of the present disclosure is not limited to a specific drawing. Characteristics disclosed in each of the drawings are combined with each other to configure a new embodiment. Reference numerals in each drawing correspond to structural elements.

FIG. 13 is a diagram illustrating a multi-round trip time (multi-RTT) positioning method to which various embodiments are applicable.

MODE FOR DISCLOSURE

Various embodiments are applicable to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented as a radio technology such as Universal Terrestrial Radio Access (UTRA) or CDMA2000. TDMA can be implemented as a radio technology such as Global System for Mobile communications (GSM)/General Packet Radio Service (GPRS)/Enhanced Data Rates for GSM Evolution (EDGE). OFDMA can be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, and Evolved UTRA (E-UTRA). UTRA is a part of Universal Mobile Telecommunications System (UMTS). 3rd Generation Partnership Project (3GPP) Long Term Evolution (LTE) is part of Evolved UMTS (E-UMTS) using E-UTRA, and LTE-Advanced (A) is an evolved version of 3GPP LTE. 3GPP NR (New Radio or New Radio Access Technology) is an evolved version of 3GPP LTE/LTE-A.

Various embodiments are described in the context of a 3GPP communication system (e.g., including LTE, NR, 6G, and next-generation wireless communication systems) for clarity of description, to which the technical spirit of the various embodiments is not limited. For the background art, terms, and abbreviations used in the description of the various embodiments, refer to the technical specifications published before the present disclosure. For example, the documents of 3GPP TS 36.211, 3GPP TS 36.212, 3GPP TS 36.213, 3GPP TS 36.300, 3GPP TS 36.321, 3GPP TS 36.331, 3GPP TS 36.355, 3GPP TS 36.455, 3GPP TS 37.355, 3GPP TS 37.455, 3GPP TS 38.211, 3GPP TS 38.212, 3GPP TS 38.213, 3GPP TS 38.214, 3GPP TS 38.215, 3GPP TS 38.300, 3GPP TS 38.321, 3GPP TS 38.331, 3GPP TS 38.355, 3GPP TS 38.455, and so on may be referred to.

1. 3GPP System 1.1. Physical Channels and Signal Transmission and Reception

In a wireless access system, a UE receives information from a base station on a downlink (DL) and transmits information to the base station on an uplink (UL). The information transmitted and received between the UE and the base station includes general data information and various types of control information. There are many physical channels according to the types/usages of information transmitted and received between the base station and the UE.

Figure 1:
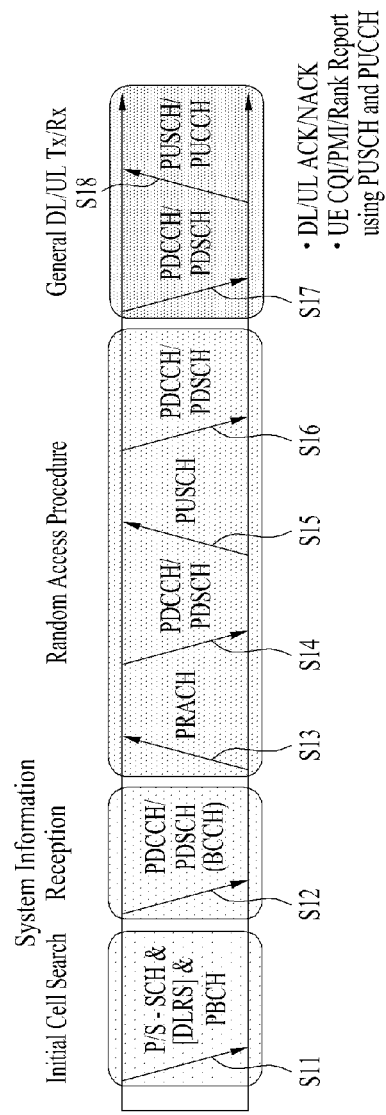
FIG. 1 is a diagram illustrating physical channels and a signal transmission method using the physical channels, which may be used in various embodiments.

FIG. 1 is a diagram illustrating physical channels and a signal transmission method using the physical channels, which may be used in various embodiments.

When powered on or when a UE initially enters a cell, the UE performs initial cell search involving synchronization with a BS in step S11. For initial cell search, the UE receives a synchronization signal block (SSB). The SSB includes a primary synchronization signal (PSS), a secondary synchronization signal (SSS), and a physical broadcast channel (PBCH). The UE synchronizes with the BS and acquires information such as a cell Identifier (ID) based on the PSS/SSS. Then the UE may receive broadcast information from the cell on the PBCH. In the meantime, the UE may check a downlink channel status by receiving a downlink reference signal (DL RS) during initial cell search.

Thereafter, the UE may receive a physical broadcast channel (PBCH) from the base station (BS), thereby obtaining broadcast information generated in the cell.

Meanwhile, the UE may receive a Downlink Reference Signal (DL RS) in the initial cell search step to confirm a downlink (DL) channel state.

After initial cell search, the UE may acquire more specific system information by receiving a physical downlink control channel (PDCCH) and receiving a physical downlink shared channel (PDSCH) based on information of the PDCCH in step S12.

Subsequently, to complete connection to the eNB, the UE may perform a random access procedure with the eNB (S13 to S16). In the random access procedure, the UE may transmit a preamble on a physical random access channel (PRACH) (S13) and may receive a PDCCH and a random access response (RAR) for the preamble on a PDSCH associated with the PDCCH (S14). The UE may transmit a PUSCH by using scheduling information in the RAR (S15), and perform a contention resolution procedure including reception of a PDCCH signal and a PDSCH signal corresponding to the PDCCH signal (S16).

On the other hand, when the random access procedure is performed in two steps, the operations S13 and S15 are performed by one operation of performing transmission by the UE, and the operations S14 and S16 are performed on operation of performing transmission by the base station.

After the above procedure, the UE may receive a PDCCH and/or a PDSCH from the BS (S17) and transmit a physical uplink shared channel (PUSCH) and/or a physical uplink control channel (PUCCH) to the BS (S18), in a general UL/DL signal transmission procedure.

Control information that the UE transmits to the BS is generically called uplink control information (UCI). The UCI includes a hybrid automatic repeat and request acknowledgement/negative acknowledgement (HARQ-ACK/NACK), a scheduling request (SR), a channel quality indicator (CQI), a precoding matrix index (PMI), a rank indicator (RI), etc.

In general, UCI is transmitted periodically on a PUCCH. However, if control information and traffic data should be transmitted simultaneously, the control information and traffic data may be transmitted on a PUSCH. In addition, the UCI may be transmitted aperiodically on the PUSCH, upon receipt of a request/command from a network.

1.2. Radio Frame Structures

Figure 2:
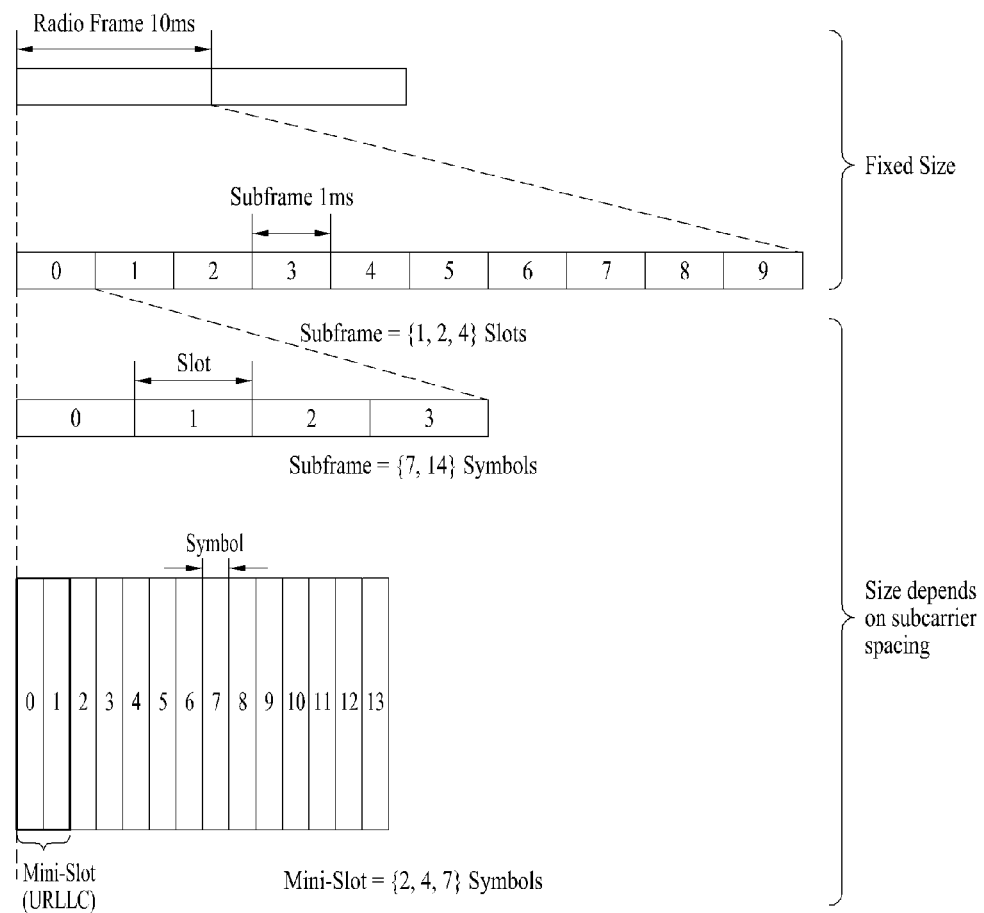
FIG. 2 is a diagram illustrating a resource grid in a new radio (NR) system to which various embodiments are applicable.

FIG. 2 is a diagram illustrating a radio frame structure in an NR system to which various embodiments of the present disclosure are applicable.

The NR system may support multiple numerologies. A numerology may be defined by a subcarrier spacing (SCS) and a cyclic prefix (CP) overhead. Multiple SCSs may be derived by scaling a default SCS by an integer N (or μ). Further, even though it is assumed that a very small SCS is not used in a very high carrier frequency, a numerology to be used may be selected independently of the frequency band of a cell. Further, the NR system may support various frame structures according to multiple numerologies.

Now, a description will be given of OFDM numerologies and frame structures which may be considered for the NR system. Multiple OFDM numerologies supported by the NR system may be defined as listed in Table 1. For a bandwidth part, μ and a CP are obtained from RRC parameters provided by the BS.

TABLE 1

| μ | Δf = $2^μ$ · 15 [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

In NR, multiple numerologies (e.g., SCSs) are supported to support a variety of 5G services. For example, a wide area in cellular bands is supported for an SCS of 15 kHz, a dense-urban area, a lower latency, and a wider carrier bandwidth are supported for an SCS of 30 kHz/60 kHz, and a larger bandwidth than 24.25 GHz is supported for an SCS of 60 kHz or more, to overcome phase noise.

An NR frequency band is defined by two types of frequency ranges, FR1 and FR2. FR1 may be a sub-6 GHz range, and FR2 may be an above-6 GHz range, that is, a millimeter wave (mmWave) band.

Table 2 below defines the NR frequency band, by way of example.

TABLE 2

| Frequency range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Regarding a frame structure in the NR system, the time-domain sizes of various fields are represented as multiples of a basic time unit for NR, $T_c=1/(\Delta f_{max}*N_f)$ where $\Delta f_{max}=480*10^3$ Hz and a value $N_f$ related to a fast Fourier transform (FFT) size or an inverse fast Fourier transform (IFFT) size is given as $N_f=4096$. $T_c$ and $T_s$ which is an LTE-based time unit and sampling time, given as $T_s=1/((15 kHz)*2048)$ are placed in the following relationship: $T_s/T_c=64$. DL and UL transmissions are organized into (radio) frames each having a duration of $T_f=(\Delta f_{max}*N_f/100)*T_c=10$ ms. Each radio frame includes 10 subframes each having a duration of $T_{sf}=(\Delta f_{max}*N_f/1000)*T_c=1$ ms. There may exist one set of frames for UL and one set of frames for DL. For a numerology μ, slots are numbered with $n_s^μ \in \{0, \ldots, N_{subframe}^{slot,μ}-1\}$ in an increasing order in a subframe, and with $n_{s,f}^μ \in \{0, \ldots, N_{frame}^{slot,μ}-1\}$ in an increasing order in a radio frame. One slot includes $N_{symb}^μ$ consecutive OFDM symbols, and $N_{symb}^μ$ depends on a CP. The start of a slot $n_s^μ$ in a subframe is aligned in time with the start of an OFDM symbol $n_s^μ*N_{symb}^μ$ in the same subframe.

Table 3 lists the number of symbols per slot, the number of slots per frame, and the number of slots per subframe, for each SCS in a normal CP case, and Table 4 lists the number of symbols per slot, the number of slots per frame, and the number of slots per subframe, for each SCS in an extended CP case.

TABLE 3

| μ | $N_{symb}^{slot}$ | $N_{slot}^{frame, μ}$ | $N_{slot}^{subframe, μ}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4

| μ | $N_{symb}^{slot}$ | $N_{slot}^{frame, μ}$ | $N_{slot}^{subframe, μ}$ |
|---|---|---|---|
| 2 | 12 | 40 | 4 |

In the above tables, $N_{symb}^{slot}$ represents the number of symbols in a slot, $N_{slot}^{frame,μ}$ represents the number of slots in a frame, and $N_{slot}^{subframe,μ}$ represents the number of slots in a subframe.

In the NR system to which various embodiments of the present disclosure are applicable, different OFDM(A) numerologies (e.g., SCSs, CP lengths, and so on) may be configured for a plurality of cells which are aggregated for one UE. Accordingly, the (absolute time) period of a time resource including the same number of symbols (e.g., a subframe (SF), a slot, or a TTI) (generically referred to as a time unit (TU), for convenience) may be configured differently for the aggregated cells.

FIG. 2 illustrates an example with μ=2 (i.e., an SCS of 60 kHz), in which referring to Table 3, one subframe may include four slots. One subframe={1, 2, 4} slots in FIG. 2, which is exemplary, and the number of slot(s) which may be included in one subframe is defined as listed in Table 3 or Table 4.

Further, a mini-slot may include 2, 4 or 7 symbols, fewer symbols than 2, or more symbols than 7.

Figure 3:
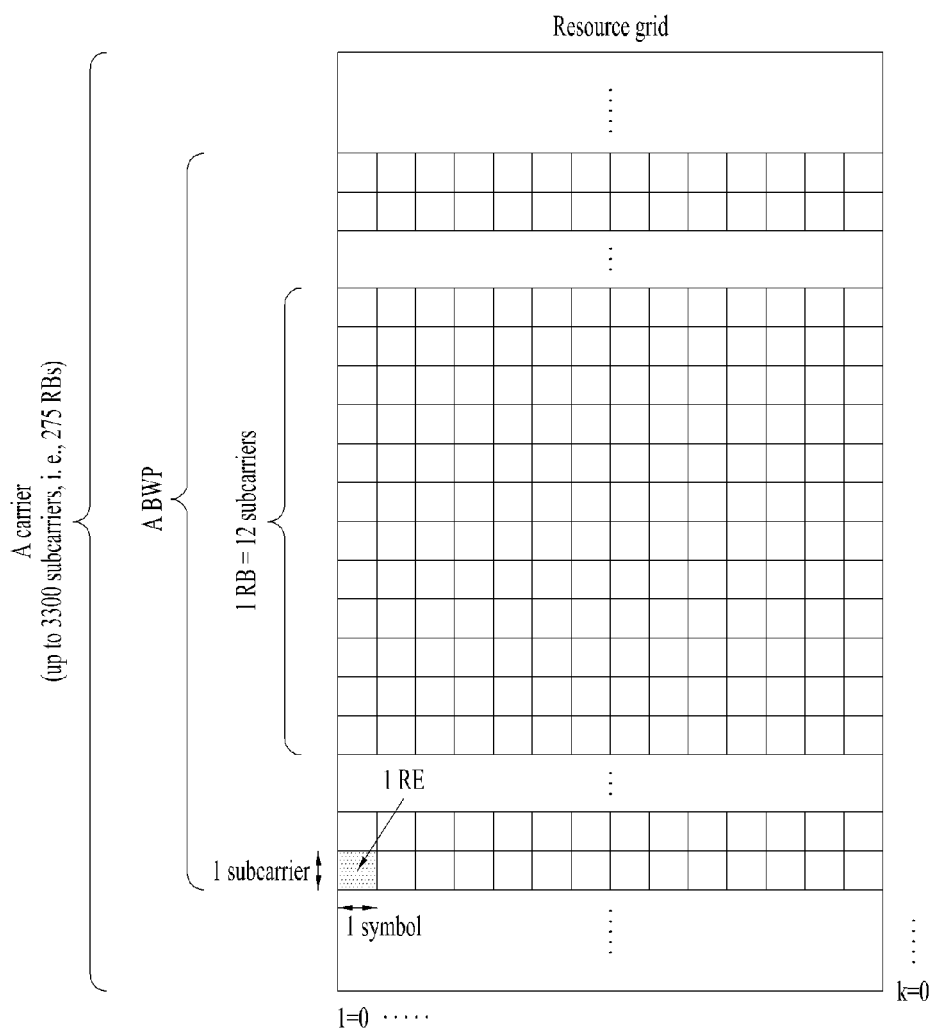
FIG. 3 is a diagram illustrating a slot structure in an NR system to which various embodiments of the present disclosure are applicable.

FIG. 3 is a diagram illustrating a slot structure in an NR system to which various embodiments of the present disclosure are applicable.

Referring FIG. 3, one slot includes a plurality of symbols in the time domain. For example, one slot includes 7 symbols in a normal CP case and 6 symbols in an extended CP case.

A carrier includes a plurality of subcarriers in the frequency domain. An RB is defined by a plurality of (e.g., 12) consecutive subcarriers in the frequency domain.

A bandwidth part (BWP), which is defined by a plurality of consecutive (P)RBs in the frequency domain, may correspond to one numerology (e.g., SCS, CP length, and so on).

A carrier may include up to N (e.g., 5) BWPs. Data communication may be conducted in an activated BWP, and only one BWP may be activated for one UE. In a resource grid, each element is referred to as an RE, to which one complex symbol may be mapped.

Figure 4:
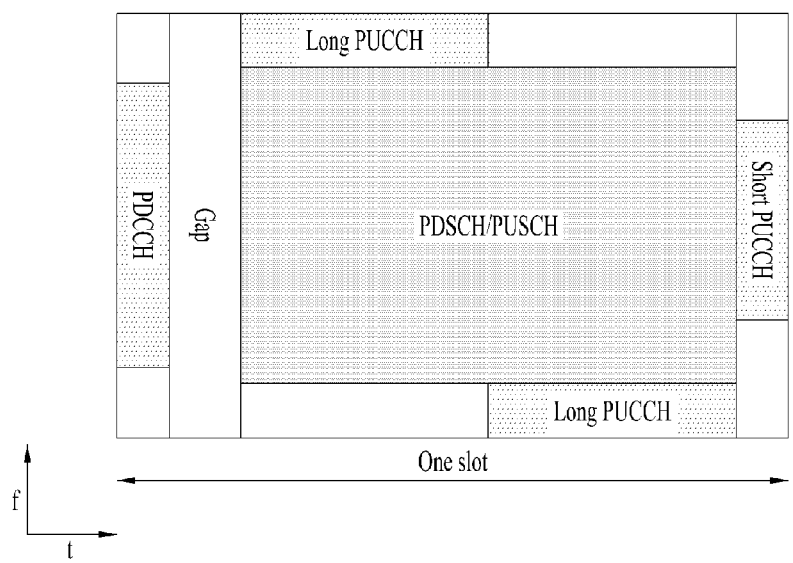
FIG. 4 is a diagram illustrating an example in which a physical channel is mapped in a slot applicable to various embodiments of the present disclosure.

FIG. 4 is a diagram illustrating an example in which a physical channel is mapped to a slot applicable to various embodiments of the present disclosure.

A DL control channel, DL or UL data, a UL control channel, and the like may be included in one slot. For example, the first N symbols in the slot are used to transmit a DL control channel (hereinafter, a DL control region), and the last M symbols in the slot may be used to transmit a UL control channel (hereinafter, a UL control region). Each of N and M is an integer greater than or equal to 0. A resource region (hereinafter referred to as a data region) between the DL data control region and the UL control region may be used for DL data transmission or may be used for UL data transmission. There may be a time gap for DL-to-UL or UL-to-DL switching between the control region and the data region. In the DL data control region, a PDCCH may be transmitted. In the DL data region, a PDSCH may be transmitted. Some symbols at the time of switching from DL to UL within a slot may be used as a time gap.

1.3. Channel Structures 1.3.1. DL Channel Structures

The BS transmits related signals to the UE on DL channels as described below, and the UE receives the related signals from the BS on the DL channels.

1.3.1.1. Physical Downlink Shared Channel (PDSCH)

The PDSCH conveys DL data (e.g., DL-shared channel transport block (DL-SCH TB)) and uses a modulation scheme such as quadrature phase shift keying (QPSK), 16-ary quadrature amplitude modulation (16QAM), 64QAM, or 256QAM. A TB is encoded into a codeword. The PDSCH may deliver up to two codewords. Scrambling and modulation mapping are performed on a codeword basis, and modulation symbols generated from each codeword are mapped to one or more layers (layer mapping). Each layer together with a demodulation reference signal (DMRS) is mapped to resources, generated as an OFDM symbol signal, and transmitted through a corresponding antenna port.

1.3.1.2. Physical Downlink Control Channel (PDCCH)

The PDCCH may deliver downlink control information (DCI), for example, DL data scheduling information, UL data scheduling information, and so on. The PUCCH may deliver uplink control information (UCI), for example, an acknowledgement/negative acknowledgement (ACK/NACK) information for DL data, channel state information (CSI), a scheduling request (SR), and so on.

The PDCCH carries downlink control information (DCI) and is modulated in quadrature phase shift keying (QPSK). One PDCCH includes 1, 2, 4, 8, or 16 control channel elements (CCEs) according to an aggregation level (AL). One CCE includes 6 resource element groups (REGs). One REG is defined by one OFDM symbol by one (P)RB.

The PDCCH is transmitted in a control resource set (CORESET). A CORESET is defined as a set of REGs having a given numerology (e.g., SCS, CP length, and so on). A plurality of CORESETs for one UE may overlap with each other in the time/frequency domain. A CORESET may be configured by system information (e.g., a master information block (MIB)) or by UE-specific higher layer (RRC) signaling. Specifically, the number of RBs and the number of symbols (up to 3 symbols) included in a CORESET may be configured by higher-layer signaling.

1.3.2. UL Channel Structures

The UE transmits related signals on later-described UL channels to the BS, and the BS receives the related signals on the UL channels from the UE.

1.3.2.1. Physical Uplink Shared Channel (PUSCH)

The PUSCH delivers UL data (e.g., a UL-shared channel transport block (UL-SCH TB)) and/or UCI, in cyclic prefix-orthogonal frequency division multiplexing (CP-OFDM) waveforms or discrete Fourier transform-spread-orthogonal division multiplexing (DFT-s-OFDM) waveforms. If the PUSCH is transmitted in DFT-s-OFDM waveforms, the UE transmits the PUSCH by applying transform precoding. For example, if transform precoding is impossible (e.g., transform precoding is disabled), the UE may transmit the PUSCH in CP-OFDM waveforms, and if transform precoding is possible (e.g., transform precoding is enabled), the UE may transmit the PUSCH in CP-OFDM waveforms or DFT-s-OFDM waveforms. The PUSCH transmission may be scheduled dynamically by a UL grant in DCI or semi-statically by higher-layer signaling (e.g., RRC signaling) (and/or layer 1 (L1) signaling (e.g., a PDCCH)) (a configured grant). The PUSCH transmission may be performed in a codebook-based or non-codebook-based manner.

1.3.2.2. Physical Uplink Control Channel (PUCCH)

The PUCCH delivers UCI, an HARQ-ACK, and/or an SR and is classified as a short PUCCH or a long PUCCH according to the transmission duration of the PUCCH. Table 7 lists exemplary PUCCH formats.

PUCCH format 0 conveys UCI of up to 2 bits and is mapped in a sequence-based manner, for transmission. Specifically, the UE transmits specific UCI to the BS by transmitting one of a plurality of sequences on a PUCCH of PUCCH format 0. Only when the UE transmits a positive SR, the UE transmits the PUCCH of PUCCH format 0 in a PUCCH resource for a corresponding SR configuration.

PUCCH format 1 conveys UCI of up to 2 bits and modulation symbols of the UCI are spread with an OCC (which is configured differently whether frequency hopping is performed) in the time domain. The DMRS is transmitted in a symbol in which a modulation symbol is not transmitted (i.e., transmitted in time division multiplexing (TDM)).

PUCCH format 2 conveys UCI of more than 2 bits and modulation symbols of the DCI are transmitted in frequency division multiplexing (FDM) with the DMRS. The DMRS is located in symbols #1, #4, #7, and #10 of a given RB with a density of ⅓. A pseudo noise (PN) sequence is used for a DMRS sequence. For 1-symbol PUCCH format 2, frequency hopping may be activated.

PUCCH format 3 does not support UE multiplexing in the same PRBS, and conveys UCI of more than 2 bits. In other words, PUCCH resources of PUCCH format 3 do not include an OCC. Modulation symbols are transmitted in TDM with the DMRS.

PUCCH format 4 supports multiplexing of up to 4 UEs in the same PRBS, and conveys UCI of more than 2 bits. In other words, PUCCH resources of PUCCH format 3 includes an OCC. Modulation symbols are transmitted in TDM with the DMRS.

1.5. UL-DL Timing Relationship

Figure 5:
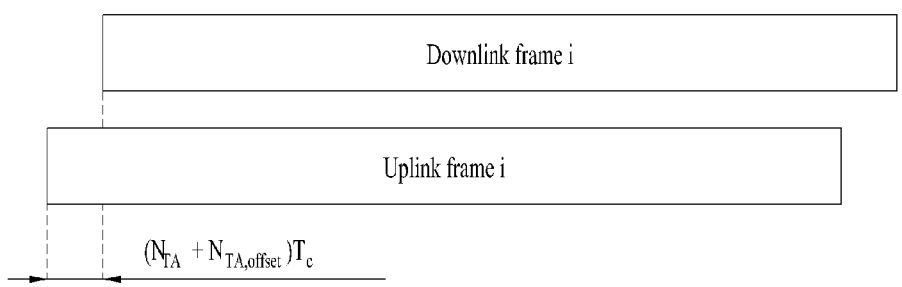
FIG. 5 is a diagram illustrating an exemplary UL-DL timing relationship, which is applicable to various embodiments of the present disclosure.

FIG. 5 is a diagram illustrating an exemplary UL-DL timing relationship applicable to various embodiments of the present disclosure.

Referring to FIG. 5, a UE starts to transmit UL frame i $T_{TA}(=(N_{TA}+N_{TA,offset})T_c)$ seconds before a DL radio frame corresponding to UL frame i. However, $T_{TA}=0$ exceptionally for a msgA transmission on a PUSCH. $T_c=0.509$ ns The UE may be provided with a value $N_{TA,offset}$ of a timing advance (TA) offset for a serving cell by n-TimingAdvanceOffset for the serving cell. When the UE is not provided with n-TimingAdvanceOffset for the serving cell, the UE may determine a default value $N_{TA,offset}$ of the TA offset for the serving cell.

In the case of a random access response, a TA command, $T_A$ for a timing advance group (TAG) indicates $N_{TA}$ values by index values of $T_A=0, 1, 2, \ldots, 3846$, where an amount of the time alignment for a TAG with an SCS of $2^\mu*15$ kHz is $N_{TA}$ $(=T_A*16*64/2^\mu)$. $N_{TA}$ is relative to the SCS of a first UL transmission from the UE after reception of a random access response.

In other cases, a TA command, $T_A$ for a TAG indicates adjustment of a current $N_{TA}$ value, $N_{TA\_old}$ to a new $N_{TA}$ value, $N_{TA\_new}$ by index values of $T_A$ (=0, 1, 2, ..., 63), where for a SCS of $2^\mu*15$ kHz, $N_{TA\_new}=N_{TA\_old}+(T_A-31)*16*64/2^\mu$.

2. Positioning

Positioning may be a process of determining the geographical location and/or speed of a UE based on the measurement of a radio signal. A client (e.g., application) related to the UE may request location information, and the location information may be reported to the client. The location information may be included in a core network or requested by the client connected to the core network. The location information may be reported in a standard format such as cell-based or geographical coordinates. Herein, an estimation error of the location and speed of the UE and/or a positioning method used for the positioning may also be reported.

2.1. Positioning Protocol Configuration

Figure 6:
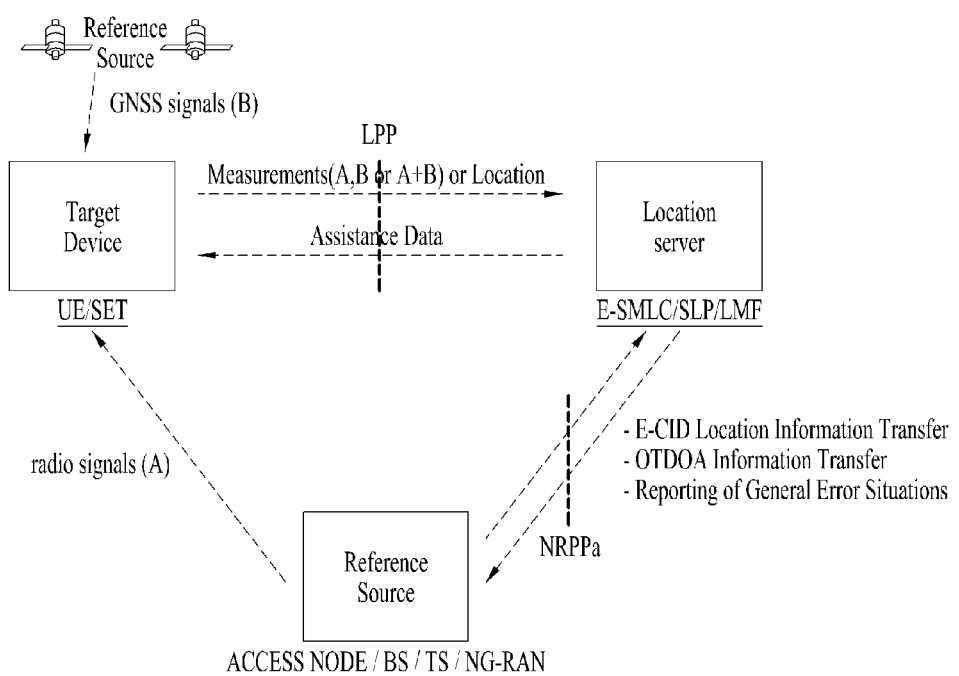
FIG. 6 is a diagram illustrating an exemplary positioning protocol configuration for UE positioning, which is applicable to various embodiments of the present disclosure.
Figure 7:
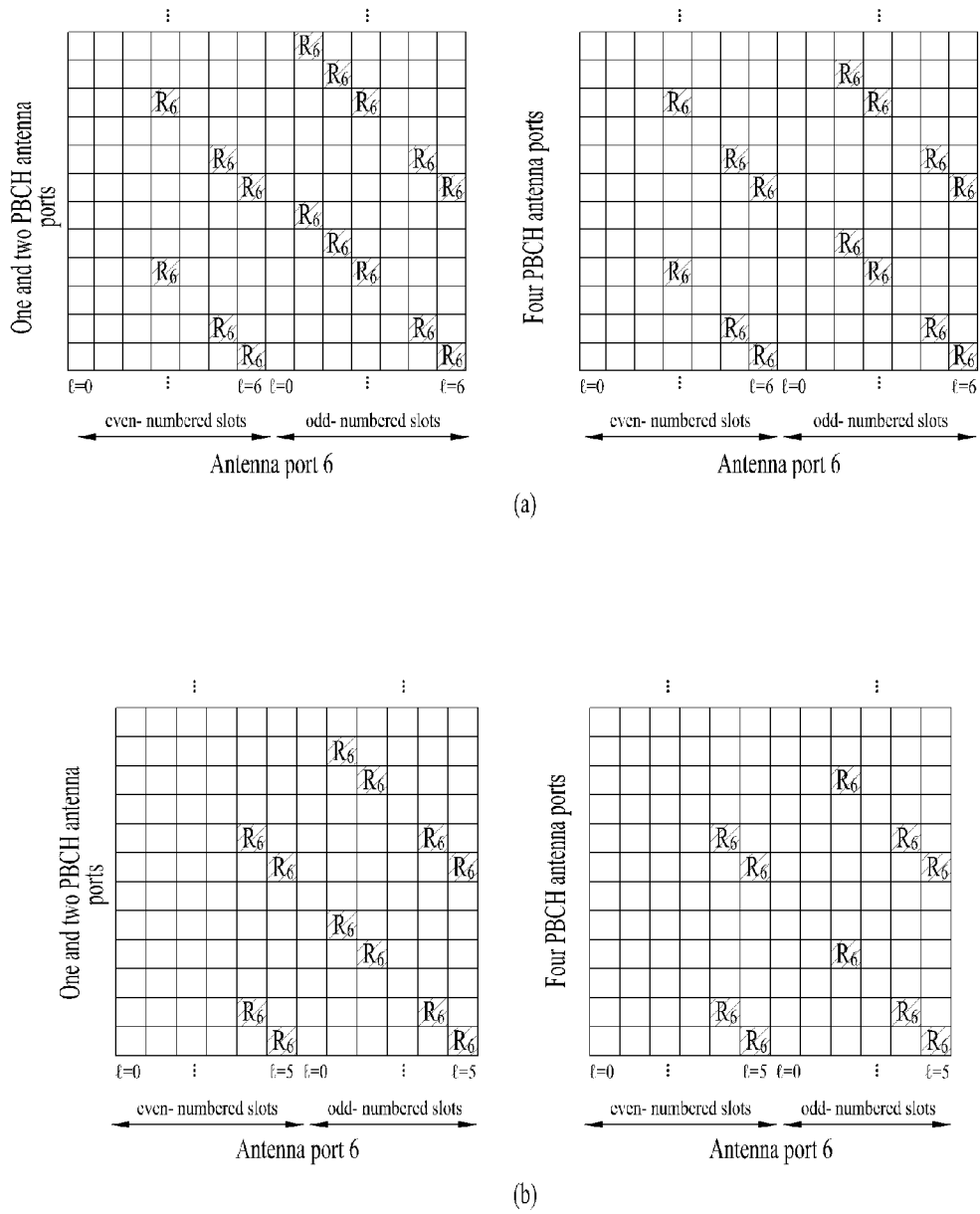
FIG. 7 illustrates exemplary mapping of a positioning reference signal (PRS) in a long term evolution (LTE) system to which various embodiments of the present disclosure are applicable.

FIG. 6 is a diagram illustrating an exemplary positioning protocol configuration for UE positioning, to which various embodiments of the present disclosure are applicable.

Referring to FIG. 6, an LTE positioning protocol (LPP) may be used as a point-to-point protocol between a location server (E-SMLC and/or SLP and/or LMF) and a target device (UE and/or SET) in order to position a target device based on positioning-related measurements obtained from one or more reference sources. The target device and the location server may exchange measurements and/or location information based on signal A and/or signal B through the LPP.

NR positioning protocol A (NRPPa) may be used for exchanging information between a reference source (access node and/or BS and/or TP and/or NG-RAN node) and a location server.

NRPPa may provide the following functions:

E-CID Location Information Transfer. This function allows exchange of location information between a reference source and an LMF, for the purpose of E-CID positioning.

OTDOA Information Transfer. This function allows exchange of information between the reference source and the LMF for the purpose of OTDOA positioning.

Reporting of General Error Situations. This function allows reporting of general error situations, for which function specific error messages have not been defined.

2.2. PRS in LTE System

For such positioning, a positioning reference signal (PRS) may be used. The PRS is a reference signal used to estimate the position of the UE.

For example, in the LTE system, the PRS may be transmitted only in a DL subframe configured for PRS transmission (hereinafter, "positioning subframe"). If both a multimedia broadcast single frequency network (MBSFN) subframe and a non-MBSFN subframe are configured as positioning subframes, OFDM symbols of the MBSFN subframe should have the same cyclic prefix (CP) as subframe #0. If only MBSFN subframes are configured as the positioning subframes within a cell, OFDM symbols configured for the PRS in the MBSFN subframes may have an extended CP.

The sequence of the PRS may be defined by Equation 1 below.

$$r_{l,n_s}(m) = \frac{1}{\sqrt{2}}(1 - 2 \cdot c(2m)) + j\frac{1}{\sqrt{2}}(1 - 2 \cdot c(2m+1)),$$ [Equation 1]

$$m = 0, 1, \ldots, 2N_{RB}^{max,DL} - 1$$

In Equation 1, $n_s$ denotes a slot number in a radio frame and l denotes an OFDM symbol number in a slot. $N_{RB}^{max,DL}$ is the largest of DL bandwidth configurations, expressed as $N_{SC}^{RB}$. $N_{SC}^{RB}$ denotes the size of an RB in the frequency domain, for example, 12 subcarriers.

c(i) denotes a pseudo-random sequence and may be initialized by Equation 2 below.

$$c_{init}=2^{28} \cdot \lfloor N_{ID}^{PRS}/512 \rfloor + 2^{10} \cdot (7 \cdot (n_s+1)+l+1) \cdot (2 \cdot (N_{ID}^{PRS} \bmod 512)+1)+2 \cdot (N_{ID}^{PRS} \bmod 512)+N_{CP}$$ [Equation 2]

Unless additionally configured by higher layers, $N_{ID}^{PRS}$ is equal to $N_{ID}^{cell}$, and $N_{CP}$ is 1 for a normal CP and 0 for an extended CP.

Figure 11:
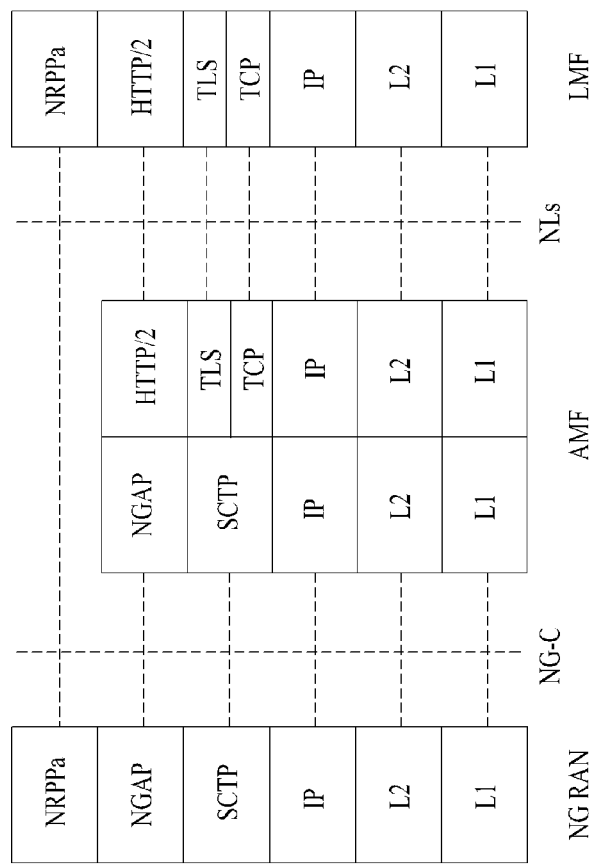
FIG. 11 is a diagram illustrating protocol layers for supporting NR positioning protocol A (NRPPa) protocol data unit (PDU) transmission, to which various embodiments are applicable.

FIG. 11 illustrates an exemplary pattern to which a PRS is mapped in a subframe.

As illustrated in FIG. 11, the PRS may be transmitted through an antenna port 6. FIG. 11(a) illustrates mapping of the PRS in the normal CP and FIG. 11(b) illustrates mapping of the PRS in the extended CP.

The PRS may be transmitted in consecutive subframes grouped for position estimation. The subframes grouped for position estimation are referred to as a positioning occasion. The positioning occasion may consist of 1, 2, 4 or 6 subframe. The positioning occasion may occur periodically with a periodicity of 160, 320, 640 or 1280 subframes. A cell-specific subframe offset value may be defined to indicate the starting subframe of PRS transmission. The offset value and the periodicity of the positioning occasion for PRS transmission may be derived from a PRS configuration index as listed in Table 11 below.

TABLE 5

| PRS configuration Index ($I_{PRS}$) | PRS periodicity (subframes) | PRS subframe offset (subframes) |
|---|---|---|
| 0-159 | 160 | $I_{PRS}$ |
| 160-479 | 320 | $I_{PRS}$-160 |
| 480-1119 | 640 | $I_{PRS}$-480 |
| 1120-2399 | 1280 | $I_{PRS}$-1120 |
| 2400-2404 | 5 | $I_{PRS}$-2400 |
| 2405-2414 | 10 | $I_{PRS}$-2405 |
| 2415-2434 | 20 | $I_{PRS}$-2415 |
| 2435-2474 | 40 | $I_{PRS}$-2435 |
| 2475-2554 | 80 | $I_{PRS}$-2475 |
| 2555-4095 | Reserved | |

A PRS included in each positioning occasion is transmitted with constant power. A PRS in a certain positioning occasion may be transmitted with zero power, which is referred to as PRS muting. For example, when a PRS transmitted by a serving cell is muted, the UE may easily detect a PRS of a neighbor cell.

The PRS muting configuration of a cell may be defined by a periodic muting sequence consisting of 2, 4, 8 or 16 positioning occasions. That is, the periodic muting sequence may include 2, 4, 8, or 16 bits according to a positioning occasion corresponding to the PRS muting configuration and each bit may have a value "0" or "1". For example, PRS muting may be performed in a positioning occasion with a bit value of "0".

The positioning subframe is designed as a low-interference subframe so that no data is transmitted in the positioning subframe. Therefore, the PRS is not subjected to interference due to data transmission although the PRS may interfere with PRSs of other cells.

2.3. UE Positioning Architecture in NR System

Figure 8:
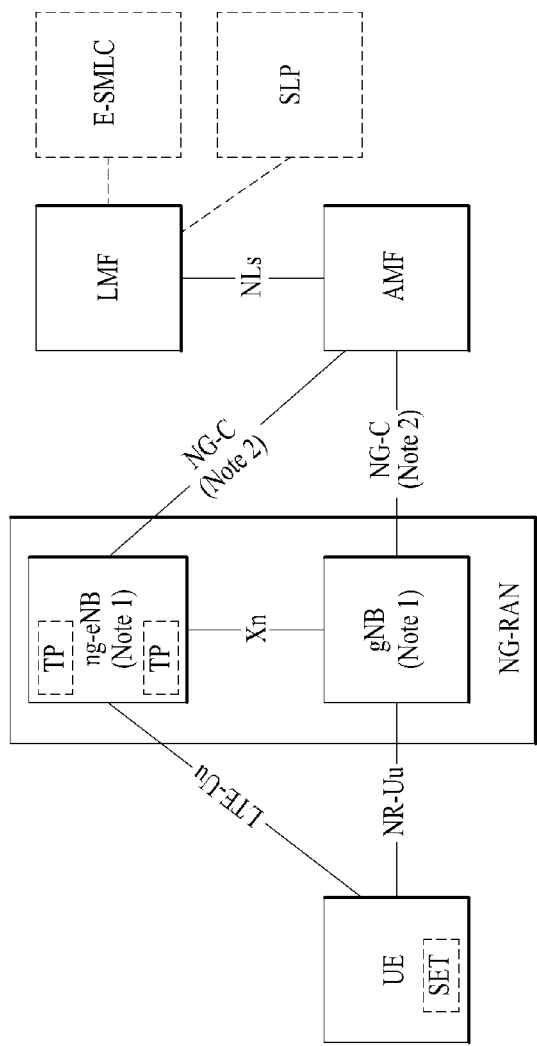
FIG. 8 is a diagram illustrating an example of an architecture of a system for positioning a UE, to which various embodiments of the present disclosure are applicable.

FIG. 8 illustrates architecture of a 5G system applicable to positioning of a UE connected to an NG-RAN or an E-UTRAN.

Referring to FIG. 8, an AMF may receive a request for a location service associated with a particular target UE from another entity such as a gateway mobile location center (GMLC) or the AMF itself decides to initiate the location service on behalf of the particular target UE. Then, the AMF transmits a request for a location service to a location management function (LMF). Upon receiving the request for the location service, the LMF may process the request for the location service and then returns the processing result including the estimated position of the UE to the AMF. In the case of a location service requested by an entity such as the GMLC other than the AMF, the AMF may transmit the processing result received from the LMF to this entity.

A new generation evolved-NB (ng-eNB) and a gNB are network elements of the NG-RAN capable of providing a measurement result for positioning. The ng-eNB and the gNB may measure radio signals for a target UE and transmits a measurement result value to the LMF. The ng-eNB may control several TPs, such as remote radio heads, or PRS-only TPs for support of a PRS-based beacon system for E-UTRA.

The LMF is connected to an enhanced serving mobile location center (E-SMLC) which may enable the LMF to access the E-UTRAN. For example, the E-SMLC may enable the LMF to support OTDOA, which is one of positioning methods of the E-UTRAN, using DL measurement obtained by a target UE through signals transmitted by eNBs and/or PRS-only TPs in the E-UTRAN.

The LMF may be connected to an SUPL location platform (SLP). The LMF may support and manage different location services for target UEs. The LMF may interact with a serving ng-eNB or a serving gNB for a target UE in order to obtain position measurement for the UE. For positioning of the target UE, the LMF may determine positioning methods, based on a location service (LCS) client type, required quality of service (QoS), UE positioning capabilities, gNB positioning capabilities, and ng-eNB positioning capabilities, and then apply these positioning methods to the serving gNB and/or serving ng-eNB. The LMF may determine additional information such as accuracy of the location estimate and velocity of the target UE. The SLP is a secure user plane location (SUPL) entity responsible for positioning over a user plane.

The UE may measure the position thereof using DL RSs transmitted by the NG-RAN and the E-UTRAN. The DL RSs transmitted by the NG-RAN and the E-UTRAN to the UE may include a SS/PBCH block, a CSI-RS, and/or a PRS. Which DL RS is used to measure the position of the UE may conform to configuration of LMF/E-SMLC/ng-eNB/E-UTRAN etc. The position of the UE may be measured by an RAT-independent scheme using different global navigation satellite systems (GNSSs), terrestrial beacon systems (TBSs), WLAN access points, Bluetooth beacons, and sensors (e.g., barometric sensors) installed in the UE. The UE may also contain LCS applications or access an LCS application through communication with a network accessed thereby or through another application contained therein. The LCS application may include measurement and calculation functions needed to determine the position of the UE. For example, the UE may contain an independent positioning function such as a global positioning system (GPS) and report the position thereof, independent of NG-RAN transmission. Such independently obtained positioning information may be used as assistance information of positioning information obtained from the network.

2.4. Operation for UE Positioning

Figure 9:
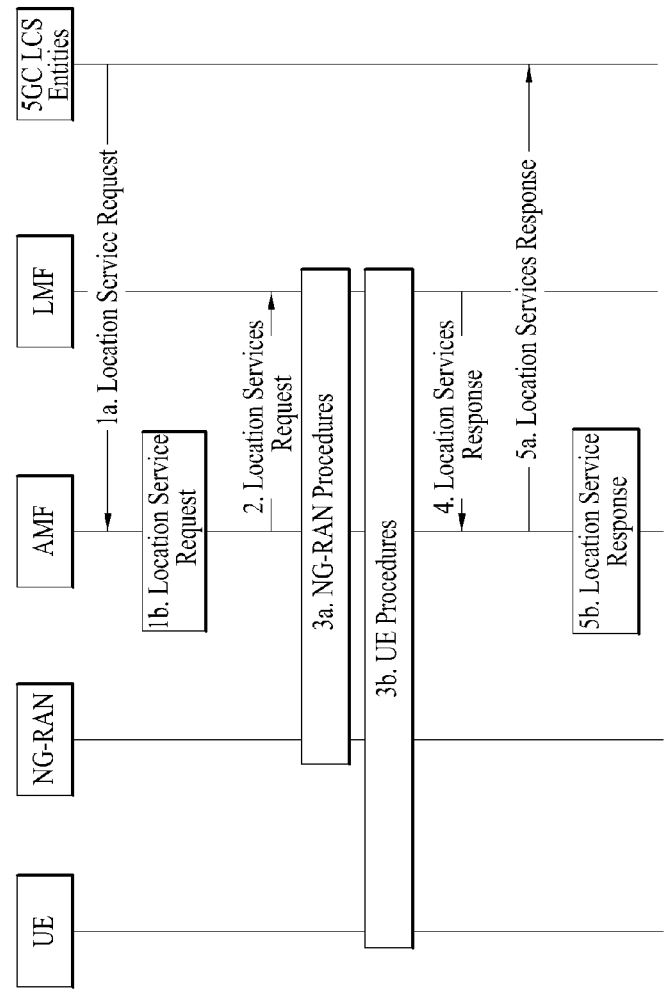
FIG. 9 is a diagram illustrating an example of a procedure of positioning a UE, to which various embodiments of the present disclosure are applicable.

FIG. 9 illustrates an implementation example of a network for UE positioning.

When an AMF receives a request for a location service in the case in which the UE is in connection management (CM)-IDLE state, the AMF may make a request for a network triggered service in order to establish a signaling connection with the UE and to assign a specific serving gNB or ng-eNB. This operation procedure is omitted in FIG. 9. In other words, in FIG. 9 it may be assumed that the UE is in a connected mode. However, the signaling connection may be released by an NG-RAN as a result of signaling and data inactivity while a positioning procedure is still ongoing.

An operation procedure of the network for UE positioning will now be described in detail with reference to FIG. 9. In step 1a, a 5GC entity such as GMLC may transmit a request for a location service for measuring the position of a target UE to a serving AMF. Here, even when the GMLC does not make the request for the location service, the serving AMF may determine the need for the location service for measuring the position of the target UE according to step 1b. For example, the serving AMF may determine that itself will perform the location service in order to measure the position of the UE for an emergency call.

In step 2, the AMF transfers the request for the location service to an LMF. In step 3a, the LMF may initiate location procedures with a serving ng-eNB or a serving gNB to obtain location measurement data or location measurement assistance data. For example, the LMF may transmit a request for location related information associated with one or more UEs to the NG-RAN and indicate the type of necessary location information and associated QoS. Then, the NG-RAN may transfer the location related information to the LMF in response to the request. In this case, when a location determination method according to the request is an enhanced cell ID (E-CID) scheme, the NG-RAN may transfer additional location related information to the LMF in one or more NR positioning protocol A (NRPPa) messages. Here, the "location related information" may mean all values used for location calculation such as actual location estimate information and radio measurement or location measurement. Protocol used in step 3a may be an NRPPa protocol which will be described later.

Additionally, in step 3b, the LMF may initiate a location procedure for DL positioning together with the UE. For example, the LMF may transmit the location assistance data to the UE or obtain a location estimate or location measurement value. For example, in step 3b, a capability information transfer procedure may be performed. Specifically, the LMF may transmit a request for capability information to the UE and the UE may transmit the capability information to the LMF. Here, the capability information may include information about a positioning method supportable by the LFM or the UE, information about various aspects of a particular positioning method, such as various types of assistance data for an A-GNSS, and information about common features not specific to any one positioning method, such as ability to handle multiple LPP transactions. In some cases, the UE may provide the capability information to the LMF although the LMF does not transmit a request for the capability information.

As another example, in step 3b, a location assistance data transfer procedure may be performed. Specifically, the UE may transmit a request for the location assistance data to the LMF and indicate particular location assistance data needed to the LMF. Then, the LMF may transfer corresponding location assistance data to the UE and transfer additional assistance data to the UE in one or more additional LTE positioning protocol (LPP) messages. The location assistance data delivered from the LMF to the UE may be transmitted in a unicast manner. In some cases, the LMF may transfer the location assistance data and/or the additional assistance data to the UE without receiving a request for the assistance data from the UE.

As another example, in step 3b, a location information transfer procedure may be performed. Specifically, the LMF may send a request for the location (related) information associated with the UE to the UE and indicate the type of necessary location information and associated QoS. In response to the request, the UE may transfer the location related information to the LMF. Additionally, the UE may transfer additional location related information to the LMF in one or more LPP messages. Here, the "location related information" may mean all values used for location calculation such as actual location estimate information and radio measurement or location measurement. Typically, the location related information may be a reference signal time difference (RSTD) value measured by the UE based on DL RSs transmitted to the UE by a plurality of NG-RANs and/or E-UTRANs. Similarly to the above description, the UE may transfer the location related information to the LMF without receiving a request from the LMF.

The procedures implemented in step 3b may be performed independently but may be performed consecutively. Generally, although step 3b is performed in order of the capability information transfer procedure, the location assistance data transfer procedure, and the location information transfer procedure, step 3b is not limited to such order. In other words, step 3b is not required to occur in specific order in order to improve flexibility in positioning. For example, the UE may request the location assistance data at any time in order to perform a previous request for location measurement made by the LMF. The LMF may also request location information, such as a location measurement value or a location estimate value, at any time, in the case in which location information transmitted by the UE does not satisfy required QoS. Similarly, when the UE does not perform measurement for location estimation, the UE may transmit the capability information to the LMF at any time.

In step 3b, when information or requests exchanged between the LMF and the UE are erroneous, an error message may be transmitted and received and an abort message for aborting positioning may be transmitted and received.

Protocol used in step 3b may be an LPP protocol which will be described later.

Step 3b may be performed additionally after step 3a but may be performed instead of step 3a.

In step 4, the LMF may provide a location service response to the AMF. The location service response may include information as to whether UE positioning is successful and include a location estimate value of the UE. If the procedure of FIG. 9 has been initiated by step 1a, the AMF may transfer the location service response to a 5GC entity such as a GMLC. If the procedure of FIG. 9 has been initiated by step 1b, the AMF may use the location service response in order to provide a location service related to an emergency call.

2.5. Positioning Protocol 2.5.1. LTE Positioning Protocol (LPP)

Figure 10:
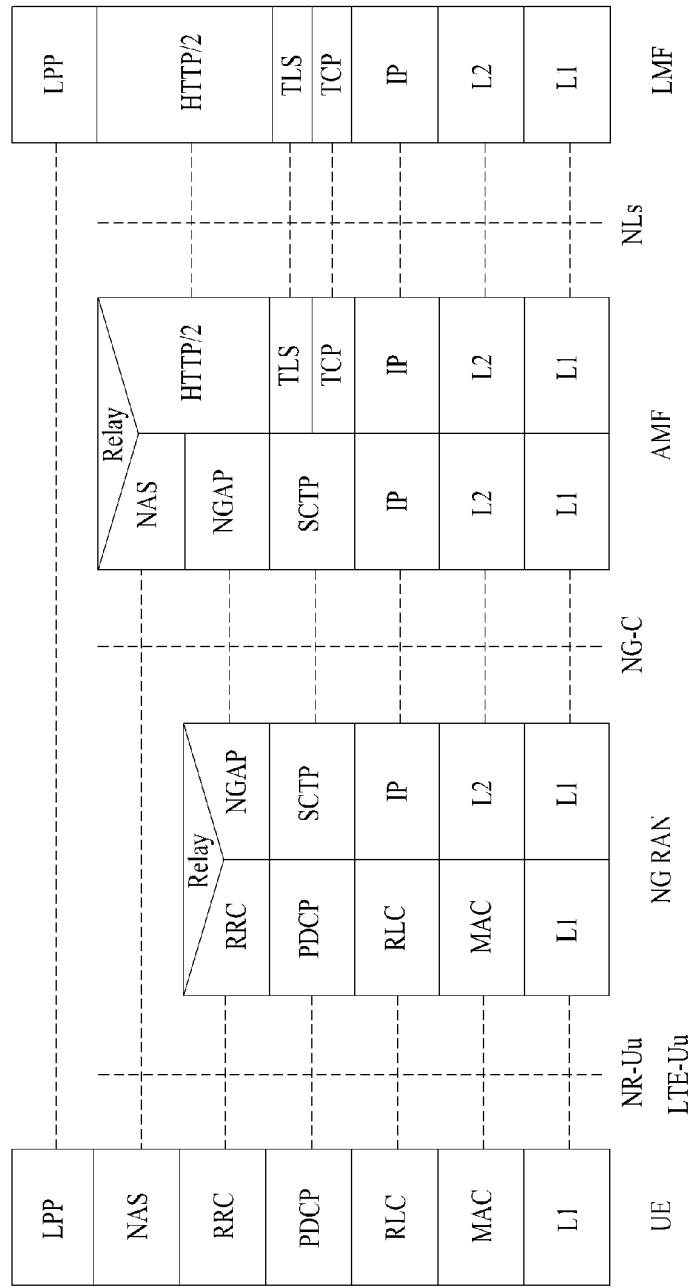
FIG. 10 is a diagram illustrating protocol layers for supporting LTE positioning protocol (LPP) message transmission, to which various embodiments are applicable.

FIG. 10 illustrates an exemplary protocol layer used to support LPP message transfer between an LMF and a UE. An LPP protocol data unit (PDU) may be carried in a NAS PDU between an AMF and the UE.

Referring to FIG. 10, LPP is terminated between a target device (e.g., a UE in a control plane or an SUPL enabled terminal (SET) in a user plane) and a location server (e.g., an LMF in the control plane or an SLP in the user plane). LPP messages may be carried as transparent PDUs cross intermediate network interfaces using appropriate protocols, such an NGAP over an NG-C interface and NAS/RRC over LTE-Uu and NR-Uu interfaces. LPP is intended to enable positioning for NR and LTE using various positioning methods.

For example, a target device and a location server may exchange, through LPP, capability information therebetween, assistance data for positioning, and/or location information. The target device and the location server may exchange error information and/or indicate abort of an LPP procedure, through an LPP message.

2.5.2. NR Positioning Protocol A (NRPPa)

FIG. 11 illustrates an exemplary protocol layer used to support NRPPa PDU transfer between an LMF and an NG-RAN node.

NRPPa may be used to carry information between an NG-RAN node and an LMF. Specifically, NRPPa may carry an E-CID for measurement transferred from an ng-eNB to an LMF, data for support of an OTDOA positioning method, and a cell-ID and a cell position ID for support of an NR cell ID positioning method. An AMF may route NRPPa PDUs based on a routing ID of an involved LMF over an NG-C interface without information about related NRPPa transaction.

An NRPPa procedure for location and data collection may be divided into two types. The first type is a UE associated procedure for transfer of information about a particular UE (e.g., location measurement information) and the second type is a non-UE-associated procedure for transfer of information applicable to an NG-RAN node and associated TPs (e.g., gNB/ng-eNB/TP timing information). The two types may be supported independently or may be supported simultaneously.

2.6. Positioning Measurement Method

Positioning methods supported in the NG-RAN may include a GNSS, an OTDOA, an E-CID, barometric sensor positioning, WLAN positioning, Bluetooth positioning, a TBS, uplink time difference of arrival (UTDOA) etc. Although any one of the positioning methods may be used for UE positioning, two or more positioning methods may be used for UE positioning.

2.6.1. OTDOA (Observed Time Difference of Arrival)

Figure 12:
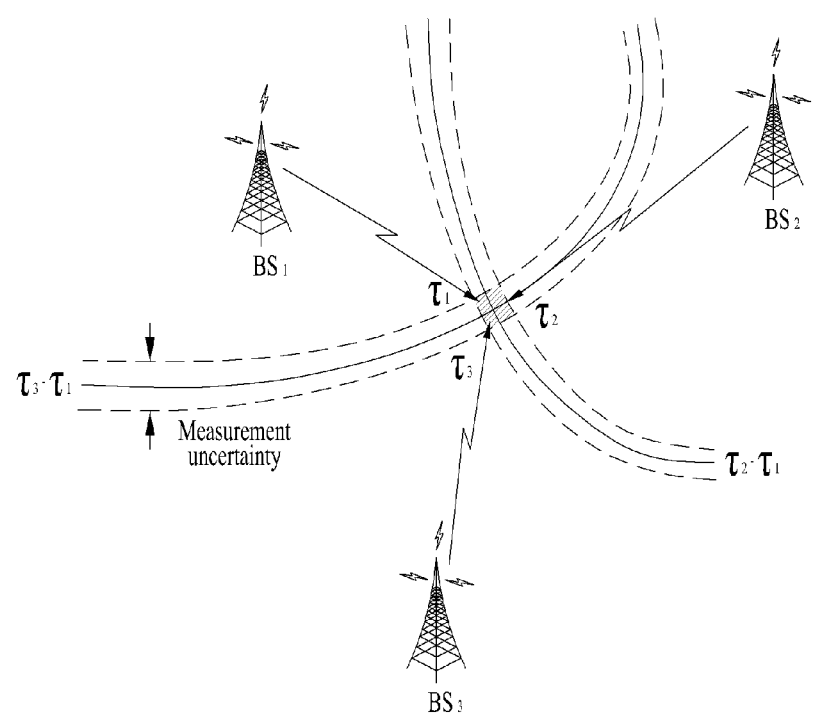
FIG. 12 is a diagram illustrating an observed time difference of arrival (OTDOA) positioning method, to which various embodiments are applicable.

FIG. 12 is a diagram illustrating an observed time difference of arrival (OTDOA) positioning method, to which various embodiments are applicable;

The OTDOA positioning method uses time measured for DL signals received from multiple TPs including an eNB, an ng-eNB, and a PRS-only TP by the UE. The UE measures time of received DL signals using location assistance data received from a location server. The position of the UE may be determined based on such a measurement result and geographical coordinates of neighboring TPs.

The UE connected to the gNB may request measurement gaps to perform OTDOA measurement from a TP. If the UE is not aware of an SFN of at least one TP in OTDOA assistance data, the UE may use autonomous gaps to obtain an SFN of an OTDOA reference cell prior to requesting measurement gaps for performing reference signal time difference (RSTD) measurement.

Here, the RSTD may be defined as the smallest relative time difference between two subframe boundaries received from a reference cell and a measurement cell. That is, the RSTD may be calculated as the relative time difference between the start time of a subframe received from the measurement cell and the start time of a subframe from the reference cell that is closest to the subframe received from the measurement cell. The reference cell may be selected by the UE.

For accurate OTDOA measurement, it is necessary to measure time of arrival (ToA) of signals received from geographically distributed three or more TPs or BSs. For example, ToA for each of TP 1, TP 2, and TP 3 may be measured, and RSTD for TP 1 and TP 2, RSTD for TP 2 and TP 3, and RSTD for TP 3 and TP 1 are calculated based on three ToA values. A geometric hyperbola is determined based on the calculated RSTD values and a point at which curves of the hyperbola cross may be estimated as the position of the UE. In this case, accuracy and/or uncertainty for each ToA measurement may occur and the estimated position of the UE may be known as a specific range according to measurement uncertainty.

For example, RSTD for two TPs may be calculated based on Equation 3 below.

$$RSTDi_{,1} = \frac{\sqrt{(x_t - x_i)^2 + (y_t - y_i)^2}}{c} - \frac{\sqrt{(x_t - x_1)^2 + (y_t - y_1)^2}}{c} + (T_i - T_1) + (n_i - n_1) \quad \text{[Equation 3]}$$

In Equation 3, c is the speed of light, $\{x_t, y_t\}$ are (unknown) coordinates of a target UE, $\{x_i, y_i\}$ are (known) coordinates of a TP, and $\{x_l, y_l\}$ are coordinates of a reference TP (or another TP). Here, $(T_i - T_l)$ is a transmission time offset between two TPs, referred to as "real time differences" (RTDs), and $n_i$ and $n_l$ are UE ToA measurement error values.

2.6.2. E-CID (Enhanced Cell ID)

In a cell ID (CID) positioning method, the position of the UE may be measured based on geographical information of a serving ng-eNB, a serving gNB, and/or a serving cell of the UE. For example, the geographical information of the serving ng-eNB, the serving gNB, and/or the serving cell may be acquired by paging, registration, etc.

The E-CID positioning method may use additional UE measurement and/or NG-RAN radio resources in order to improve UE location estimation in addition to the CID positioning method. Although the E-CID positioning method partially may utilize the same measurement methods as a measurement control system on an RRC protocol, additional measurement only for UE location measurement is not generally performed. In other words, an additional measurement configuration or measurement control message may not be provided for UE location measurement. The UE does not expect that an additional measurement operation only for location measurement will be requested and the UE may report a measurement value obtained by generally measurable methods.

For example, the serving gNB may implement the E-CID positioning method using an E-UTRA measurement value provided by the UE.

Measurement elements usable for E-CID positioning may be, for example, as follows.

UE measurement: E-UTRA reference signal received power (RSRP), E-UTRA reference signal received quality (RSRQ), UE E-UTRA reception (Rx)-transmission (Tx) time difference, GERAN/WLAN reference signal strength indication (RSSI), UTRAN common pilot channel (CPICH) received signal code power (RSCP), and/or UTRAN CPICH Ec/Io E-UTRAN measurement: ng-eNB Rx-Tx time difference, timing advance ($T_{ADV}$), and/or AoA Here, $T_{ADV}$ may be divided into Type 1 and Type 2 as follows.

$T_{ADV}$ Type 1=(ng-eNB Rx-Tx time difference)+(UE E-UTRA Rx-Tx time difference)

$T_{ADV}$ Type 2=ng-eNB Rx-Tx time difference

AoA may be used to measure the direction of the UE. AoA is defined as the estimated angle of the UE counterclockwise from the eNB/TP. In this case, a geographical reference direction may be north. The eNB/TP may use a UL signal such as an SRS and/or a DMRS for AoA measurement. The accuracy of measurement of AoA increases as the arrangement of an antenna array increases. When antenna arrays are arranged at the same interval, signals received at adjacent antenna elements may have constant phase rotate.

2.6.3. UTDOA (Uplink Time Difference of Arrival)

UTDOA is to determine the position of the UE by estimating the arrival time of an SRS. When an estimated SRS arrival time is calculated, a serving cell is used as a reference cell and the position of the UE may be estimated by the arrival time difference with another cell (or an eNB/TP). To implement UTDOA, an E-SMLC may indicate the serving cell of a target UE in order to indicate SRS transmission to the target UE. The E-SMLC may provide configurations such as periodic/non-periodic SRS, bandwidth, and frequency/group/sequence hopping.

2.6.4. Multi RTT (Multi-Cell RTT)

Compared to OTDOA positioning requiring fine synchronization (e.g., at the nano-second level) between TPs in the network, RTT positioning requires only coarse timing TRP (e.g., BS) synchronization although it is based on TOA measurements like OTDOA positioning.

FIG. 13 is a diagram illustrating an exemplary multi-RTT positioning method to which various embodiments of the present disclosure are applicable.

Referring to FIG. 13(a), an RTT process is illustrated, in which an initiating device and a responding device perform TOA measurement, and the responding device provides a TOA measurement to the initiating device, for RTT measurement (calculation). For example, the initiating device may be a TRP and/or a UE, and the responding device may be a UE and/or a TRP.

In operation 1701 according to an exemplary embodiment, the initiating device may transmit an RTT measurement request, and the responding device may receive the RTT measurement request.

In operation 1703 according to an exemplary embodiment, the initiating device may transmit an RTT measurement signal at time to, and the responding device may obtain TOA measurement $t_1$.

In operation 1705 according to an exemplary embodiment, the responding device may transmit an RTT measurement signal at time t2, and the initiating device may obtain TOA measurement t3.

In operation 1707 according to an exemplary embodiment, the responding device may transmit information about [t2−t1], and the initiating device may receive the corresponding information and calculate an RTT based on Equation 4 below. The corresponding information may be transmitted and received by a separate signal or in the RTT measurement signal of operation 1705.

$$RTT = t_3 - t_0 - [t_2 - t_1] \quad \text{[Equation 4]}$$

Referring to FIG. 13(b), an RTT may correspond to a double-range measurement between two devices. Positioning estimation may be performed from the corresponding information, and multilateration may be used for the positioning estimation. d1, d2, and d3 may be determined based on the measured RTT, and the location of a target device may be determined to be the intersection of the circumferences of circles with radiuses of d1, d2, and d3, in which BS1, BS2, and BS3 (or TRPs) are centered respectively.

3. Various Embodiments of the Present Disclosure

Various embodiments of the present disclosure will be described below in detail based on the above-described technical idea. Clause 1 and clause 2 may be applied to the various embodiments of the present disclosure. For example, operations, functions, and terms which are not defined in the various embodiments of the present disclosure may be performed and described based on clause 1 and clause 2.

Symbol/abbreviations/terms used in the following description of various embodiments of the present disclosure are described below.

A/B/C: A, B, and/or C
AOA (AoA): angle of arrival
CSI-RS: channel state information reference signal
ECID: enhanced cell identifier
GPS: global positioning system
GNSS: global navigation satellite system
LMF: location management function
LPP: LTE positioning protocol
Measurement: The measurement may refer to, for example, measurement used for UE positioning. For example, the measurement may refer to TOA/TOF/(UE) Rx-Tx time difference/RSTD/RSRP measurement, etc.
Network (Network Node): The network (network node) may be a (cellular) BS/TP/location server/LMF and/or any device that plays the same role as those of the (cellular) BS/TP/location server/LMF.
NRPPa: NR positioning protocol a
OTDOA (OTDoA): observed time difference of arrival
PRS: positioning reference signal
RAT: radio access technology
RS: reference signal
RTT: round trip time
RSRP: reference signal reception power
RSTD: reference signal time difference/relative signal time difference
SRS: sounding reference signal
SS: synchronization signal
SSB: synchronization signal block
SS/PBCH: synchronization signal/physical broadcast channel
TDOA (TDoA): timing difference of arrival
TOA (ToA): time of arrival
TRP: transmission reception point (TP: transmission point)
UTDOA (UTDoA): uplink time difference of arrival In description of various embodiments of the present disclosure, base station (BS) can be understood as comprehensive terminology including a remote radio head (RRH), an eNB, a gNB, a TP, an RP (reception point), a relay, and the like.

In description of various embodiments of the present disclosure, "less than or equal to B" may be replaced with "equal to or less than B".

In the description of various embodiments of the present disclosure, less than/less than B may be replaced with less than/below B.

In description of various embodiments of the present disclosure, an RS (e.g., PRS, etc.) resource set may include one or more RS resources. For example, the identity of the RS resource set may be defined by an identifier (ID)/index assigned to the RS resource set. For example, a specific RS resource set may be configured in conjunction with a specific cell/TP/BS.

For example, assuming that the RS resource set 1 is {0, 1, 2, 3} and the RS resource set 2 is {0, 1, 2, 3} (in this example, an element of the set refers to an RS resource identifier ID), the RS resource (ID) in each set has the same value, so that RS resources may not be distinguished only using information about the RS resource ID and information about the RS resource set ID can also be provided together with the RS resource ID information. As another example, assuming that RS resources can be distinguished from one of the RS resource set (ID) or the RS resource (ID), one of information about the corresponding RS resource set (ID) or information about the RS resource (ID) may be provided.

Various embodiments of the present disclosure may provide a method for effectively reporting the measurement quality so as to effectively measure the location of a UE by utilizing measurement of the UE and/or the network node (e.g., LMF/location server/TP, etc.) acquired for UE positioning purposes, and an apparatus for supporting the same.

In description of various embodiments of the present disclosure, there may be a quality metric as an example of quality for measurement. For example, a separated matrix corresponding to the quality of each measurement, such as RSTD/UE Rx-Tx time difference/UL RTOA(uplink relative time of arrival)/BS Rx-Tx time difference/UL AOA (including 'azimuth of arrival', 'zenith of arrival', etc.), can be reported.

For example, the UE may inform a location server/LMF, etc. of the quality for RSTD/OTDOA measurement through an LPP.

For example, the above-described quality may be defined as "OTDOA-MeasQuality" indicating the 3GPP TS 36.355 parameter. For example, the quality of the above-described measurement can be reported through OTDOA-MeasQuality.

For example, if the UE location is estimated based on the RSTD/TOA/propagation time measured by the UE, the UE may inform the location server or the like of the absolute measurement quality so as to indicate the presence or absence of an error.

For example, when the UE location is estimated by a method such as triangulation in the location server/LMF, the location server/LMF may improve the location estimation/calculation accuracy of the UE by excluding an excessively low measurement value (for example, a value equal to or less than a predetermined threshold) from the measurement quality/confidence values reported to the UE.

Taking an 'LPP' as an example, a parameter "NR-TimingMeasQuality" (which may represent a best estimated value for the measurement quality of a target device) can be constructed as shown in Tables 6 to 7 below.

TABLE 6

– NR-TimingMeasQuality
The IE NR-TimingMeasQuality defines the target device's best estimate of
the quality of measurements

```
-- ASN1START
NR-TimingMeasQuality-r16 ::= SEQUENCE {
    timingMeasQualityValue-r16          INTEGER (0..31),
    timingMeasQualityResolution-r16     ENUMERATED {mdot1, m1, m10, m30, ...},
    ...
}
-- ASN1STOP
```

TABLE 7

NR-TimingMeasQuality field descriptions timingMeasQualityValue

This parameter provides the best estimate of the uncertainty of the measurement timingMeasQualityResolution This parameter provides the resolution levels used in the Value field.

For example, timing measurement quality (e.g., timing measurement quality for each measurement, etc.) such as quality/confidence (for example, timingMeasQualityValue, and timingMeasQualityResolution contained in NR-TimingMeasQuality) can be reported (or can correspond/or mapped, etc.) as values (e.g., absolute values) indicative of timing measurement quality such as quality/confidence.

However, for example, in order to obtain a measurement, such as propagation time/TOA/RSTD/Rx-Tx time difference for RS (e.g., PRS, etc.) transmitted through multiple Tx beams of multiple cells/TPs/BSs and/or multiple Tx beams of each cell/TP/BS, as well as to report the quality/confidence of each measurement, signaling overhead may be significantly large.

Therefore, according to various embodiments of the present disclosure, the UE can reduce signaling overhead by reporting the relative quality rather than the absolute measurement quality, and the location server/LMF can select and use the measurement to be used for calculation/estimation of the UE location based on the relative quality of the received measurement.

In description of various embodiments of the present disclosure, the relative quality refers to the quality for the measured/acquired measurement, and may be the remaining values other than the absolute quality corresponding to the absolute value of the measured/obtained measurement quality. For more specific examples, refer to the description of various embodiments of the present disclosure below.

Various embodiments of the present disclosure will be described in more detail.

Figure 14:
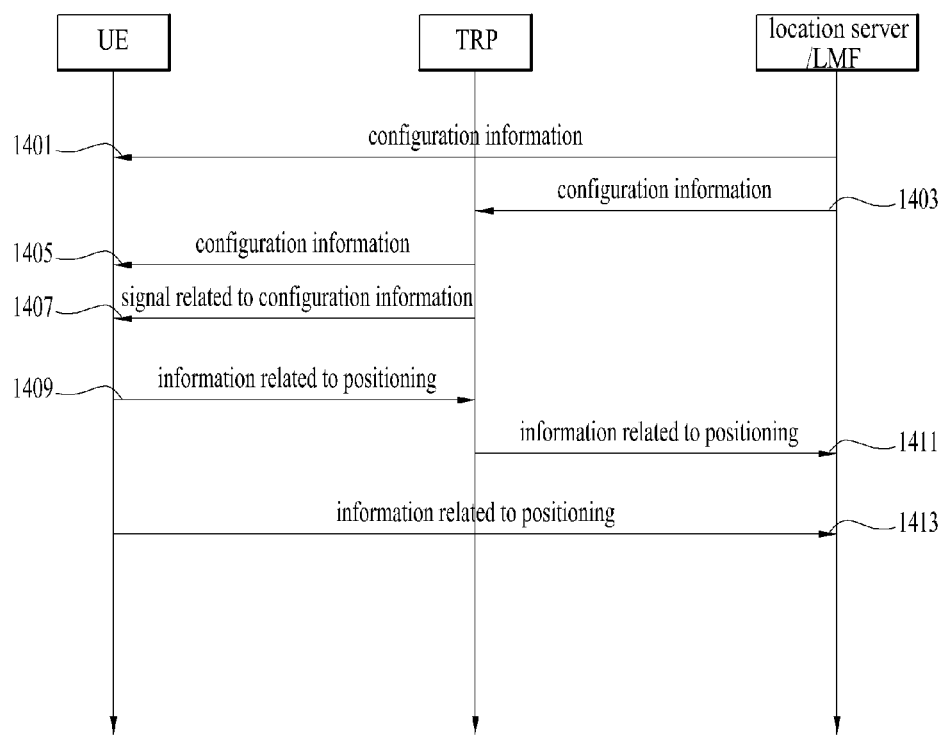
FIG. 14 is a simplified diagram illustrating a method of operating a UE, a transmission and reception point (TRP), a location server, and/or a location management function (LMF) according to various embodiments.

FIG. 14 is a diagram illustrating a method for operating the UE, the TRP, the location server, and/or the LMF according to various embodiments of the present disclosure.

Referring to FIG. 14, in operation 1401 according to an exemplary embodiment, the location server and/or the LMF may transmit configuration information to the UE, and the UE may receive the configuration information.

On the other hand, in operation 1403 according to an exemplary embodiment, the location server and/or the LMF can transmit reference configuration information to the transmission and reception point (TRP), and the TRP can receive the reference configuration information. In operation 1405, according to an exemplary embodiment, the TRP may transmit the reference configuration information to the UE, and the UE may receive the reference configuration information. In this case, operation 1401 according to an exemplary embodiment may be omitted.

Conversely, operations 1403 and 1405 according to an exemplary embodiment may be omitted. In this case, operation 1401 according to an exemplary embodiment may be performed.

That is, operation 1401 according to an exemplary embodiment and operations 1403 and 1405 according to an exemplary embodiment may be optional.

In operation 1407 according to an exemplary embodiment, the TRP can transmit a signal related to configuration information to the UE, and the UE can receive the signal. For example, the signal related to the configuration information may be a signal for UE positioning.

In operation 1409 according to an exemplary embodiment, the UE may transmit a signal related to positioning to the TRP, and the TRP may receive the signal. In operation 2011, the TRP may transmit a signal related to the positioning to the location server and/or the LMF, and the location server and/or the LMF may receive the signal.

On the other hand, in operation 1413, the UE can transmit a signal related to positioning to the location server and/or the LMF, and the location server and/or the LMF can receive the signal. In this case, operations 1409 and 1411 according to an exemplary embodiment may be omitted.

Conversely, operation 1413 according to an exemplary embodiment may be omitted. In this case, operations 1411 and 1413 according to an exemplary embodiment may be performed.

That is, operations 1409 and 1411 according to an exemplary embodiment and operation 1413 according to an exemplary embodiment may be optional.

In an exemplary embodiment, the signal related to positioning may be obtained based on the configuration information and/or a signal related to the configuration information.

Figure 15:
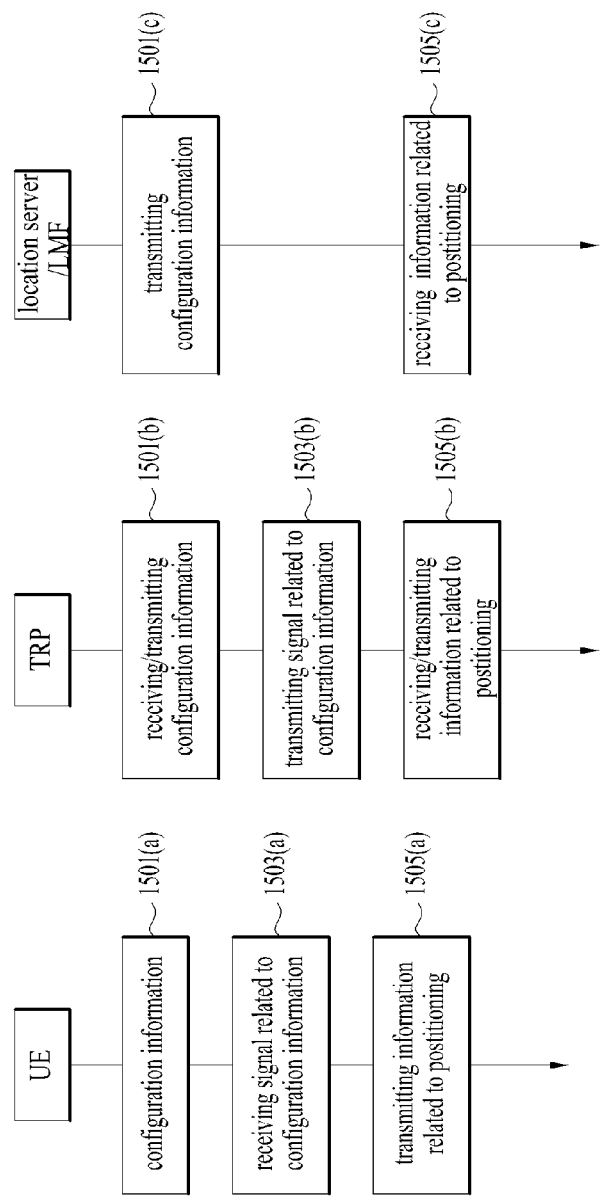
FIG. 15 is a simplified diagram illustrating a method of operating a UE, a TRP, a location server, and/or an LMF according to various embodiments.

FIG. 15 is a simplified diagram illustrating a method for operating the UE, TRP, location server, and/or the LMF according to various embodiments of the present disclosure.

Referring to FIG. 15(a), in operation 1501(a) according to an exemplary embodiment of the present disclosure, the UE may receive configuration information.

In operation 1503(a) according to an exemplary embodiment, the UE can receive a signal related to configuration information.

In operation 1505(a) according to an exemplary embodiment, the UE can transmit information related to positioning.

Referring to FIG. 15(b), in operation 1501 (b) according to an exemplary embodiment, the TRP can receive configuration information from the location server and/or the LMF, and can transmit the configuration information to the UE.

In operation 1503(*b*) according to an exemplary embodiment, the TRP can transmit a signal related to the configuration information.

In operation 1505(*b*) according to an exemplary embodiment, the TRP can receive information related to positioning, and can transmit the received information to the location server and/or the LMF.

Referring to FIG. 15(*c*), in operation 1501(*c*) according to an exemplary embodiment, the location server and/or the LMF may transmit configuration information.

In operation 1505(*c*) according to an exemplary embodiment, the location server and/or the LMF can receive information related to positioning.

For example, the configuration information described above may be understood as being reference configuration (information) or at least one information that is transmitted (configured) from the location server, the LMF, and/or the TRP to the UE, or may be understood as the corresponding reference configuration (information), reference configuration (information), and at least one information that is transmitted(configured) from the location server, the TRP, and/or the TRP to the UE.

For example, the signal related to the above-described measurement may be understood as a signal related to one or more of the information reported by the UE in the description of various embodiments of the present disclosure below, and/or as a signal including one or more of the information reported by the corresponding UE.

For example, in the description of various embodiments of the present disclosure below, the BS, the gNB, the cell, etc. can be replaced with a TRP, a TP, or any device that plays the same role.

For example, in the description of various embodiments of the present disclosure below, the location server can be replaced with the LMF or any device that plays the same role.

More specific operations, functions, terms, and the like in operation according to each exemplary embodiment may be performed and described based on various embodiments of the present disclosure described below. Meanwhile, the operations according to each exemplary embodiment are exemplary, and one or more of the operations described above according to the specific contents of each embodiment may be omitted.

Various embodiments of the present disclosure will now be described in detail. Various embodiments of the present disclosure described below may be combined in whole or in part to constitute other embodiments unless mutually exclusive, which will be clearly understood by a person skilled in the art.

3.0. Proposal #0

For example, the UE may receive an RS (e.g., a PRS, etc.) to obtain a measurement (e.g., TOA/propagation time/Rx-Tx time difference/RSTD/RSRP, etc.) for UE positioning purposes from the location server/LMF/BS.

For example, the location server/LMF/BS may set/instruct a measurement quality report for each TP/RS resource set/RS resource for one or multiple TPs/RS resource sets/RS resources. At this time, for example, the UE can obtain one or more measurements for each TP/RS resource set/RS resource, can select one representative measurement from among the measurements, and can report the selected measurement as a measurement quality representative of each TP/RS resource set/RS resource.

For example, the UE can select a measurement having the best measurement quality among measurements obtained from each TP/RS resource set/RS resource.

For example, the UE can select/report an average quality of one measurement corresponding to the upper X (>0) percent from among measurements obtained from each TP/RS resource set/RS resource as the measurement quality for each TP/RS resource set/RS resource. For example, X may be a real number greater than or equal to 0.

3.1. Proposal #1

For example, the UE can receive an RS (e.g., PRS, etc.) to obtain a measurement for UE positioning purposes from the location server/LMF/base station.

For example, the UE may report absolute measurement quality and/or relative measurement quality to the location server/LMF/BS, along with a report on the obtained measurement information, for measurements obtained using the received RS. And/or, for example, the relative measurement quality may be performed independently of the obtained measurement information report.

For example, the UE can report the absolute measurement quality for a particular quality with first measurement quality information. For example, absolute measurement quality may mean an error range that may be generated when estimating the UE location using the obtained measurement quality. That is, for example, the absolute measurement quality determines how much error occurs when measuring the UE position using TOA/(UE) Rx-Txt time difference/RSTD measurement (for example, how many meters or less an error occurs).

The UE may be configured/instructed from the location server/LMF/base station to report the relative measurement quality as the second measurement quality information without reporting the first measurement quality information. More specifically, according to various embodiments of the present disclosure, one or more of the following proposals may be considered in relation to the relative quality of measurement.

3.2. Proposal #2 Relative Quality of RSTD/TOA/TOF/Propagation Time/RSRP/RX-TX Time Difference For example, the UE can evaluate and/or report relative quality for each obtained measurement.

Measurement (Relative Ranking/Rank Measurement Report for Each RSTD/UE RX-TX Time Difference/TOA/TOF/Propagation Time)

(Total Rank/Ranking) For example, for a total of N (>=1) measurements obtained through RS (e.g., PRS, etc.), the UE may be set/instructed from the LMF/location server/base station to report ranking of the quality (e.g., measurement quality) of the total N measurements (e.g., measurement quality) to the LMF/location server/base station. For example, the UE may be configured/instructed to report ranking/rank information of RSTD/Rx-Tx time difference/TOA/TOF/propagation time. For example, N may be a natural number. For example, N may be a predetermined value and/or may be a value determined by the LMF/location server/base station.

(Upper/lower X samples/ratio) For example, for a total of N (>=1) measurements obtained through RS (e.g., PRS, etc.), the UE may be set/instructed from the LMF/location server/base station so as to report measurement information corresponding to the best (and/or the worst) X (>0) (and/or X(>0) percent) measurement information from among the total of N measurements to the LMF/location server/base station. For example, when the UE reports the RSTD/Rx-Tx time difference/TOA/TOF/propagation time, one bit is allocated as information indicating the quality of measurement, RSTD/Rx-Tx time difference/TOA/TOF/propagation time measurement information may be reported as '0'(or '1'), and the remaining RSTD/Rx-Tx time difference/TOA/TOF/propagation time measurement information may be reported as '1'(or '0'). For example, N may be a natural number. For example, N may be a predetermined value and/or a value configured by the LMF/location server/BS. For example, X may be a natural number/real number (e.g., a real number greater than zero). For example, X may be a predetermined value and/or may be a value configured by the LMF/location server/base station.

For example, when one or more analog beams are used, the UE may obtain and/or report one or more measurements for a particular cell/TP/base station and/or an RS (e.g., PRS, etc.) resource set and/or an RS resource. And/or, for example, the UE may select and report one representative measurement for each of the cell/TP/BS and/or for each of the RS resource set and/or the RS resource.

Considering this point, for example, the UE may need not report a measurement quality while simultaneously reporting a measurement, such as a UE operation based on an LPP (e.g., 3GPP TS 36.355, etc.). That is, for example, the relative measurement quality may be reported as TP information and/or RS resource set information and/or RS information separately from the measurement information. In view of this point, according to various embodiments of the present disclosure, one or more of the following proposals may be considered. The following description may be combined with one or more of the embodiments mentioned in this section and the description of various embodiments of the present disclosure.

Measuring and Reporting of Relative Ranging/Rank for Each Cell/TP/BS (Total Rank/Ranking) For example, when RS (e.g., PRS, etc.) is transmitted from N (>=1) cells/TPs/base stations, the UE may select one of the measurements obtained from each cell/TP/BS, may evaluate the measurement quality obtained from N cells/TPs/BSs, and may be configured/instructed to report the cell/TP/BS information to the LMF/location server/BS when reporting the measurement quality ranking to the LMF/location server/BS. For example, the UE can obtain ranking/rank information ranging from the best cell/TP/BS having obtained the best measurement quality to the worst cell/TP/BS having obtained the worst measurement quality, and can report the obtained ranking/rank information as the cell/TP/BS information (for example, a cell/TP/base station ID, an index, etc.). For example, the UE may sequentially report the RSTD measurement quality ranging from the $1^{st}$ RSTD measurement quality to the N-th RSTD measurement in the order of the cell→TP→BS ID. For example, the UE may sequentially report TP ID_1, TP ID_2, TP ID_3, . . . , TP ID_N. Based on the reported information, the LMF/location server/BS may recognize that the best/worst measurement quality was obtained in the order of TP_1 corresponding to TP ID_1→TP_2 corresponding to TP ID_2→TP_3 corresponding to TP ID_3, . . . , →TP_N corresponding to TP ID_N. For example, N may be a natural number.

(Upper/lower X samples/ratios) For example, when RS (e.g., PRS, etc.) is transmitted from N (>=1) cells/TPs/BSs, the UE can report the best X cells/TPs/BSs information (e.g., cell/TP/BS ID, index, etc.) having the best quality from among the N cells/TPs/BSs to the LMF/location server/base station. For example, the above-described UE operation may be configured/instructed from the LMF/location server/base station. For example, the UE may be configured/instructed to report TP information (e.g., TP ID, etc.) corresponding to the lower X percent of the measurement quality to the LMF/location server/base station. For example, N may be a natural number. For example, X may be a natural number/real number (e.g., a real number greater than zero). For example, X may be a predetermined value and/or may be a value configured by the LMF/location server/base station.

Measuring and/or Reporting of Relative Ranking/Rank for Each RS (e.g., PRS, Etc.) Resource Set (Total rank/ranking) For example, the UE may receive N (>=1) RS resource sets (e.g., PRS, etc.). For example, the UE may select one of the measurements obtained using each RS resource set, may evaluate the measurement quality obtained from the N RS resource sets, and may be configured/instructed to report RS resource set information (e.g., RS resource set ID/index, etc.) when the measurement quality rank/ranking is reported to the LMF/location server/BS. For example, the UE can report the rank/ranking information ranging from the RS resource set having the best measurement quality to the other RS resource set having the worst measurement quality. For example, the UE may sequentially report the RSTD measurement quality according to the RS resource set ID in order from the $1^{st}$ rank to the N-th rank. For example, the UE may sequentially report the RS resource set information in the order of RS resource set ID_1→RS resource set ID_2→RS resource set ID_3, . . . , →RS resource set ID_N. The LMF/location server/BS can recognize that the best/worst measurement quality was obtained in the order of RS resource set_1 corresponding to RS resource set ID_1→RS resource set_2 corresponding to RS resource set ID_2→RS resource set_3 corresponding to RS resource set ID_3 . . . , →RS resource set N corresponding to RS resource set ID_N. For example, N may be a natural number.

(Upper/lower X samples/ratios) For example, the UE may obtain UE measurements using N (>=1) RS resource sets (e.g., PRS, etc.), and may report the best X (and/or X percent) number of RS resource set information (e.g., RS resource set ID/index, etc.) having the best measurement quality (or the worst X number of RS resource set information having the worst measurement quality) to the LMF/location server/BS. For example, the UE operation may be configured/instructed from the LMF/location server/base station. For example, the UE may be configured/instructed to report RS resource set information (e.g., RS resource set ID/index, etc.) corresponding to the lower X percent of the measurement quality to the LMF/location server/base station. For example, N may be a natural number. For example, X may be a natural number/real number (i.e., a real number greater than zero). For example, X may be a predetermined value and/or may be a value configured by the LMF/location server/base station.

Measuring and/or Reporting of Relative Ranging/Rank for Each RS (for Example, PRS, Etc.)

(Total rank/ranking) For example, for one or more RS (e.g., PRS) resources transmitted from one or more cells/TPs/BSs, the UE may be configured/instructed from the LMF/location server/BS to evaluate the relative measurement quality for measurements obtained using the RS resources and to report the measurement quality ranking/rank information for each RS resource to the LMF/location server/base station. For example, the UE may report measurement quality rank/ranking obtained using N(>=1) RS (e.g., PRS, etc.) resources as RS resource information (e.g., RS resource ID/index, etc.). For example, the UE operation may be configured/instructed from the LMF/location server/base station. For example, the UE may sequentially report RS resource ID_1, RS resource ID_2, RS resource ID 3, . . . , RS resource ID_N, etc. As a result, the LMF/location server/base station may recognize that the best/worst measurement quality has been obtained in the order of RS resource_1 corresponding to RS resource ID_1→RS resource_2 corresponding to RS resource ID_2→RS resource_3 corresponding to RS resource ID_3, . . . , →RS resource N corresponding to RS resource ID_N. For example, N may be a natural number.

In particular, for RS resources transmitted from a specific cell/TP/base station, the evaluation and/or reporting of the measurement quality for each RS resource can be viewed as reporting the quality for various Tx beams used for each cell/TP/base station. In particular, for example, the quality for the transmission (Tx) beam may be associated with the Tx beam for UE positioning, and may be estimated in a different way from the quality of the data Tx/Rx beams.

(Upper/lower X percents) For example, when N (>1) RS (e.g., PRS, etc.) resources are transmitted, the UE may report, to the LMF/location server/BS, RS resource information (e.g., RS resource ID/index, etc.) of the best upper X number of RS resources having the best measurement quality (or the worst lower X number of RS resources having the worst measurement quality) from among N RS resources. For example, the UE operation may be configured/instructed from the LMF/location server/base station. For example, N may be a natural number. For example, X may be a natural number/real number (e.g., a real number greater than zero). For example, X may be a predetermined value and/or may be a value configured from the LMF/location server/base station.

For example, the LMF/location server/base station can utilize M(>=1)-best Tx beams and/or M(>=1)-best Tx-Rx beam pair information to be used for the purpose of UE positioning from the viewpoint of the UE. That is, for example, the UE may report, to the LMF/location server/base station, the best M (>=1)-best RS resources having the measurement quality for UE positioning and/or information about the M(>=1)-best RS resources and Rx panel corresponding to the M(>=1)-best RS resources. For example, M may be a natural number. For example, M may be a predetermined value and/or may be a value configured by the LMF/location server/base station.

3.2-1. Proposal #2-1 Relative Quality of Measurement at Cell/TP/BS

For example, the cell/TP/base station may transmit, to the LMF and the location server, relative quality information for the cell/TP/BS measurement (e.g., AOA, ZOA (zenith of arrival), RTOA (relative time of arrival), BS (eNB/gNB) Rx-Tx time difference, etc.) acquired through the BS (e.g., SRS) transmitted from the UE. For example, the operation of the base station (BS) may be configured/instructed/requested from the LMF/location server.

For example, relative measurement quality information may refer to rank/ranking information for all cells/TPs/BSs, and this rank/ranking information is transferred to the LMF/location server.

For example, the LMF/location server may configure/instruct/request only the measurement information corresponding to the upper X percent to the cell/TP/base station, and the cell/TP/base station may indicate only measurement information corresponding to the upper X percent from among measurement values that have been measured/obtained according to the setting/instruction/request of the LMF/location server. In this case, for example, the base station (BS) may inform the LMF/location server of information indicating that the remaining information other than the upper X percent was excluded and reported. For example, the BS may inform the LMF/location server of information indicating that the remaining measurements other than the upper X percent from among the measured/obtained measurements have been excluded and reported. For example, X may be a real number (e.g., a real number greater than zero). For example, X may be a predetermined value and/or may be a value configured by the LMF/location server/BS.

Figure 16:
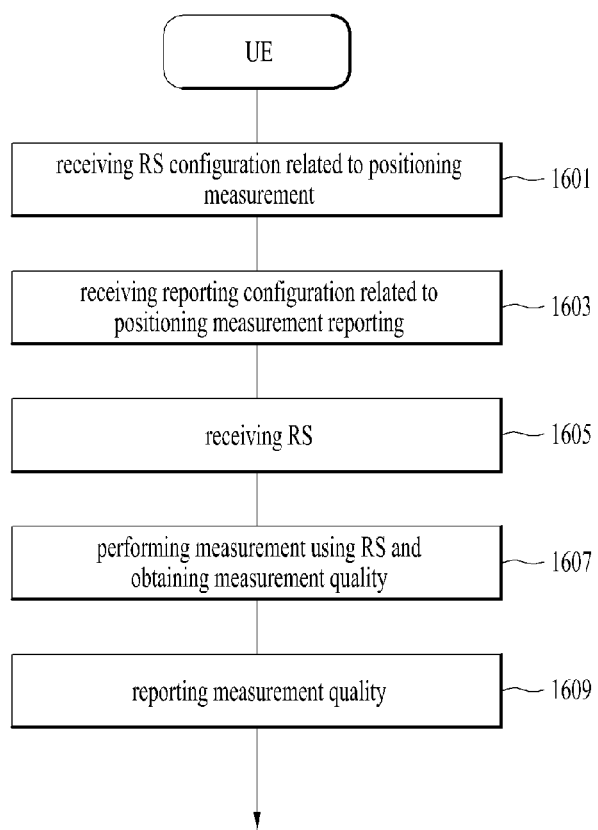
FIG. 16 is a flowchart illustrating a method for operating a user equips (UE) according to various embodiments of the present disclosure.

FIG. 16 is a flowchart illustrating a method for operating the UE according to various embodiments of the present disclosure.

Referring to FIG. 16, in operation 1601 according to an exemplary embodiment, the UE may receive the RS (e.g., PRS, etc.) related to positioning measurement. For example, the UE may receive the RS for obtaining a measurement for UE positioning from the LMF/location server/base station.

In operation 1603 according to an exemplary embodiment, the UE may receive a reporting configuration related to a positioning measurement report. For example, the UE may receive a configuration/instruction message that reports measurements measured/acquired from the LMF/location server/base station. For example, when the UE receives configuration/instruction information that reports such measurement, the UE may receive the configuration/instruction information reporting the measurement quality for the measured/obtained measurement. For example, the measurement quality may be a relative measurement quality.

In operation 1605 according to an exemplary embodiment, the UE may receive the RS. For example, the RS may be received based on the RS configuration.

In operation 1607 according to an exemplary embodiment, the UE may perform measurement using the RS, may perform measurement acquisition, and/or may obtain the measurement quality (e.g., relative measurement quality). For example, the measurement and/or the measurement quality obtained by the UE may be based on the reporting configuration.

In operation 1609 according to an exemplary embodiment, the UE may report the measurement quality. For example, the UE may report information about the relative measurement quality to the LMF/location server/base station.

More specific operations of the UE according to various embodiments of the present disclosure can be described and performed based on the above-described proposals #0 to 2-1.

Each operation of the UE according to various embodiments of the present disclosure described above may be performed simultaneously and/or may be performed independently. Also, for example, some or all of the order of each operation of the UE may be changed and/or at least a portion of the order of each operation of the UE may be omitted.

Figure 17:
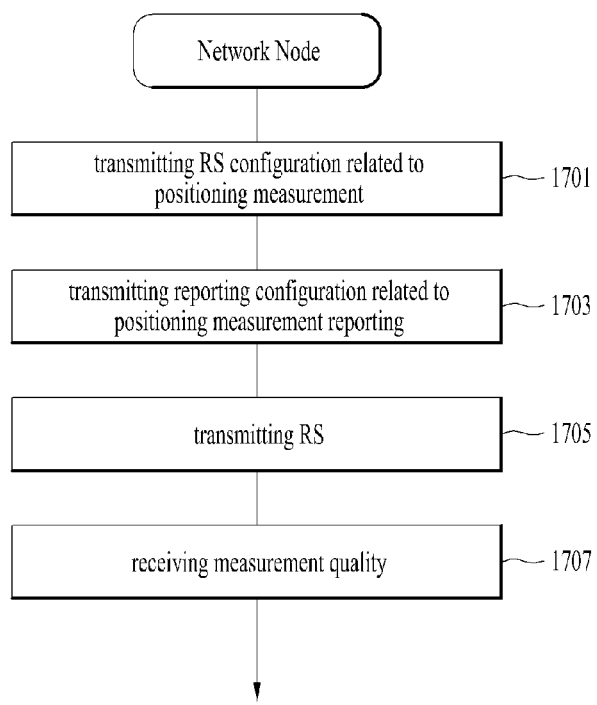
FIG. 17 is a flowchart illustrating a method for operating a network node according to various embodiments of the present disclosure.

FIG. 17 is a flowchart illustrating a method for operating the network node according to various embodiments of the present disclosure. For example, the network node may be the location server, the LMF, the TP, and/or any device that performs the same task.

Referring to FIG. 17, in operation 1701 according to an exemplary embodiment, the network node may transmit the RS (e.g., PRS, etc.) related to positioning measurement. For example, the network node may allocate the RS for obtaining measurement of UE positioning to the UE.

In operation 1703 according to an exemplary embodiment, the network node may transmit a reporting configuration related to a positioning measurement report. For example, the network node can configure/instruct the measured/acquired measurement to the UE. For example, when the network node performs setting/instruction required for the measurement report, the network node may perform setting/instruction for reporting the measurement quality related to the measured/obtained measurement. For example, the measurement quality may refer to the relative measurement quality.

In operation 1705 according to an exemplary embodiment, the network node may transmit the RS. For example, the RS may be transmitted based on the RS configuration (or in response to the RS configuration).

In operation 1707, the network node may receive the measurement quality. For example, the network node may receive information about the relative measurement quality from the UE. For example, the measurement quality information may be based on reporting configurations.

More specific operations of the network node according to various embodiments of the present disclosure can be described and performed based on the above-described proposals #0 to #2-1.

Each operation of the network node according to various embodiments of the present disclosure can be performed simultaneously and/or independently. Also, for example, some or all of the order of each operation of the network node may be changed and/or at least a portion of the order of each operation of the network node may be omitted. For example, when the network node is the LMF/location server, the operation of transmitting the RS may be omitted.

Various embodiments of the present disclosure may be related to the relative measurement quality assessment and/or reporting. Various embodiments of the present disclosure below may relate to a method for reducing signaling overhead of absolute measurement quality information reports supported in the LPP. At least a portion of various embodiments of the present disclosure below may be combined with at least a portion of the above-described embodiments of the present disclosure to configure various embodiments of the present disclosure.

3.3. Proposal #3 Threshold Instruction/Configuration for Absolute Measurement Quality For example, the UE can measure the UE measurement quality (e.g., (UE) Rx-Tx time difference/TOA/TOF/propagation time/RSTD/RSRP, etc.) acquired using the RS (e.g., PRS, etc.) configured for UE positioning. For example, the LMF/location server/base station may instruct/configure a specific level/value/threshold value for the measured quality.

(Measurement level reporting) For example, the LMF/location server/base station may configure/instruct a minimum level/level/numerical value (e.g., threshold) of the measurement quality to be used for UE positioning, and may allocate the configured/instructed information to the UE. For example, when the UE converts the (UE) Rx-Tx time difference/TOA/TOF/propagation time/RSTD/RSRP into a distance value (e.g., meter values), the LMF/location server/base station may discriminate between one measurement obtained when a threshold exceeds X meters and the other measurement obtained when a threshold value does not exceed X meters, and may instruct the UE to report the discriminated result. As an example of a method for performing reporting by the UE, when the UE reports the measurement quality, one bit is allocated. In this case, if the measurement quality exceeds X meters, the UE may report the value of '0' (or '1'), and/or if the measurement quality does not exceed X meters, the UE may report the value of '1' (or '0'). In another example, in a situation where the threshold value (e.g., an error less than or equal to X meters) for the measurement quality received from the LMF/location server/BS is not satisfied, the UE may be configured/instructed to exclude and report the measurement (i.e., measurement that does not satisfy the threshold value). For example, X may be a real number (i.e., a real number greater than zero). For example, X may be a predetermined value and/or may be a value configured by the LMF/location server/base station. In the above example, although X was described as being measured in meters, the scope of the present disclosure is not limited thereto, and X may also be set to have other units corresponding to the distance value.

NOTE: For example, a measurement value may not include the ID/index, etc. assigned unlike the cell/TP/BS/RS, so that it may be difficult to execute measurement quality information that exceeds the threshold or does not exceed the threshold in a different way from the measurement information report. Thus, for example, in order for the measurement quality information reporting to be performed separately from the measurement information reporting, it may be preferable that such operation be performed at the cell/TP/BS level, the RS resource set level, and/or the RS resource level.

(Cell/TP/BS level reporting) For example, the LMF/location server/base station may configure/instruct a minimum level/numerical value (e.g., threshold) of the measurement quality to be used for UE positioning. For example, when the UE converts a measurement error (e.g., the (UE) Rx-Tx time difference/TOA/TOF/propagation time/RSTD/RSRP) into the distance value (e.g., meter values), the LMF/location server/base station may configure/instruct the cell/TP/BS information (e.g., cell/TP/BS ID/index, etc.) where the measurement not exceeding the threshold (indicating X meters) can be obtained, so that the UE can report the configured/instructed information. In another example, when the UE location is estimated through the obtained measurement value, the positioning error equal to or higher than X(>0) can be excluded from the measurement obtained by calculation of the UE location. For example, when the measurement quality obtained from a specific cell/TP/BS is equal to or less than (or equal to or higher than) a specific level/numerical value, the LMF/location server/BS may configure/instruct the cell/TP/BS information so that the UE can report the configured/instructed information. For example, the network may configure/instruct, in the UE, information (e.g., cell/TP/BS ID/index, etc.) about only the expected error (not exceeding X(>0) meters) of the measurement obtained from the specific cell/TP/BS, so that the UE can report the configured/instructed information. For example, X may be a real number (e.g., a real number greater than zero). For example, X may be a predetermined value and/or may be a value configured by the LMF/location server/base station. In the above example, X is described as being measured in meters, but this is one example, and X may be set to have other units corresponding to the distance value.

For example, when one or more measurements are obtained and/or reported for each cell//TP/BS, the operation of reporting the measurement quality in the cell/TP/BS level can reduce overhead.

(RS resource set level reporting) For example, the LMF/location server/base station may configure/instruct, in the UE, the minimum level/numerical value (e.g., threshold) of the measurement quality to be used for UE positioning. For example, the LMF/location server/base station may perform setting/instruction required for reporting the RS resource set information, when the measurement quality obtained from each resource set (e.g., PRS, etc.) is equal to or less than a specific level/numerical value. Conversely, for example, when the measurement quality obtained from each RS resource set is equal to or higher than a specific level/numerical value, the LMF/location server/BS can perform setting/instruction so as to report the RS resource set information corresponding to the obtained measurement quality. For example, for the measurement obtained using the RS resource set configured by the UE, the LMF/location server/base station may configure/instruct, in the UE, the RS resource set information (e.g., RS resource set ID/index, etc.) where the expected error not exceeding the value of X($>$0) can be obtained, so that the UE can report the obtained RS resource set information. For example, X may be a real number (e.g., a real number greater than zero). For example, X may be a predetermined value and/or may be a value configured by the LMF/location server/base station. In the above example, although X is described as being measured in meters, the scope of the present disclosure is not limited thereto, and X may also be set to have other units corresponding to the distance value. For example, X may be a real number (a real number greater than zero). For example, X may be a predetermined value and/or may be a value set from the LMF/location server/base station. In the above example, X has been described in units of meters, but this is an example, and X may be set to have other units corresponding to distance values.

For example, two RS resource sets are linked to two transmission (Tx) panels oriented in different directions to one cell/TP/base station, so that a situation in which RS resources are transmitted in different directions can be assumed. In this case, for example, the measurement quality for RS resources belonging to a specific set from among two RS resource sets received from the cell/TP/base station to the UE may be better. For example, such quality information may be utilized for RS resource set reconfiguration for the UE and/or approximate location of the UE.

(RS resource level reporting) For example, the LMF/location server/base station may configure/instruct, in the UE, the minimum level/numerical value (e.g., threshold) of the measurement quality to be used for UE positioning. For example, the LMF/location server/base station may configure/instruct, in the UE, the RS resource information (e.g., RS resource ID/index, etc.) so that the UE can report the RS resource information when the measurement quality obtained using a specific RS resource is equal to or less than a specific level. Conversely, for example, the LMF/location server/base station may configure/instruct, in the UE, RS resource information generated in a situation where the measurement quality obtained from each RS resource is equal to or less than a specific level/numerical value, so that the UE can report the RS resource information corresponding to this situation. For example, for the measurement obtained using RS resources configured in the UE, the LMF/location server/base station may configure/instruct, in the UE, RS resource information (e.g., RS resource ID/index, etc.) where a measurement for allowing the expected error not to exceed X($>$0) can be obtained, so that the UE can report this RS resource information. For example, X may be a real number (e.g., a real number greater than zero). For example, X may be a predetermined value and/or may be a value configured by the LMF/location server/base station. In the above example, although X is described as being measured in meters, the scope of the present disclosure is not limited thereto, and X may be set to have other units corresponding to the distance value.

3.4. Proposal #4 Relative/Absolute UE Measurement Quality—Grade Evaluation

For example, the UE may configure/instruct, in the UE, the measurement quality related to a measurement obtained using the configured RS (e.g., PRS, etc.) to be used for UE positioning, so that the UE can report the configured/instructed measurement quality to the LMF//location server/base station. At this point, for example, the measurement quality may be defined as two or more grades and/or levels, and the UE may report each measurement quality as a specific grade and/or level. For example, this UE operation can be configured/instructed by the LMF/location server/BS.

For example, information related to the grade and/or level may be configured/instructed by the LMF/location server/base station.

For example, the number of grades indicating the measurement quality and/or the number of levels indicating the measurement quality may be configured/instructed in the UE by the LMF/location server/BS.

For example, the UE may receive configuration/instruction information from the LMF/location server/BS in a manner that the measurement quality is reported as one of four grades (e.g., A, B, C, D (A$>$B$>$C$>$D)).

For example, information about the reference for classifying the measurement quality and/or information about the absolute value/numerical value may be configured/instructed in the UE by the LMF/location server/BS.

For example, assuming that the UE position is measured/estimated/acquired using a measurement (e.g., a measurement obtained using the RS), if the expected distance error (and/or the position estimation error) is equal to or less than 1 meter, the first grade may be decided. If the expected distance error (and/or the position estimation error) is in the range from 1 meters to 3 meters, the second grade may be decided. If the expected distance error (and/or the position estimation error) is in the range from 3 meters to 10 meters, the third grade may be decided. If the expected distance error (and/or the position estimation error) is equal to or longer than 10 meters, the fourth grade may be decided. For example, a value (e.g., a meter value, etc.) about the error for each grade may be configured/instructed in the UE by the LMF/location server/BS.

For example, binary decision may be considered as having two grades. For example, binary decision may be one of two alternatives. In this case, for example, binary decision may be set as having '1' or '0'. For example, 0 (or 1) may correspond to poor quality. For example, '1' (or '0') may correspond to good quality. For example, the UE may report such information (0 or 1) to the LMF/location server/BS. Similarly, for example, for a binary decision report on the measurement quality of the UE, the LMF/location server/base station may configure/instruct, in the UE, a specific threshold value for the measurement quality. For example, if the corresponding value exceeds the instructed threshold, '1' (or '0') may be reported. Otherwise, '0' (or '1') may be reported. For example, when the measurement value (for example, RSTD/TOF/UE Rx-Tx time difference/RSRP, etc.) is reported, one bit is allocated so that this bit can be reported as a measurement quality value.

(Grade for each ratio) For example, after evaluating the absolute quality for the measurement obtained by the UE, the evaluation result is classified for each percent and the grade for each measurement can be decided.

For example, a first grade may be defined as a measurement corresponding to the best 25 percent (%), a second grade may be defined as a measurement corresponding to 25-50 percent, a third grade may be defined as a measurement corresponding to 50-75 percent and a measurement corresponding to 75-100 percent (lower 25 percent).

For example, the number of total grades and/or the ratio corresponding to each grade may be configured/instructed in the BS by the LMF/location server.

For example, from among the plurality of obtained measurements, measurement information equal to or less than a specific grade may be configured/instructed/requested by the LMF/location server so that this measurement information equal to or less than a specific grade is not reported to the LMF/location server.

3.5. UE-Leading Minimum Quality Reporting

For example, for a measurement obtained using the configured RS (e.g., PRS) to be used for UE positioning, the measurement quality may be configured/instructed in the UE by the LMF/location server/base station so that this measurement quality can be reported to the LMF/location server/base station. At this time, for example, the UE can autonomously determine/select a minimum measurement, and can report the determined/selected information to the LMF/location server/base station. And/or, for example, the UE may report one measurement satisfying the minimum quality and the other measurement not satisfying the minimum measurement to the LMF/location server/base station, so that the two measurements can be distinguished from each other by the LMF/location server/base station.

And/or, for example, when the UE reports measurement information not satisfying the minimum measurement quality to the LMF/location server/BS, this measurement information can be excluded from target information to be reported. For example, measurement information not satisfying the minimum measurement quality may not be reported, and only measurement information satisfying the minimum measurement quality may be reported.

For example, although OTDOA signal measurement information (e.g., a measurement report for the serving cell) for all measurements and signal measurement information (e.g., a measurement report for the neighbor cell) for the neighbor cell are configured/instructed by the LMF/location server/base station, values (such as RSTD/TOA/OTDOA measurement quality) other than the cell information (e.g., cell ID, etc.) and/or the system frame number may not be reported.

For example, the operation for allowing the UE to autonomously decide/select the minimum measurement quality may refer to the operation for allowing the UE to autonomously decide/configure/select a minimum threshold for the measurement quality, rather than receiving a threshold for the measurement quality.

3.6. Configuration/Instruction of Absolute Measurement Quality and/or Error Range Information According to various embodiments of the present disclosure, a method for informing/reporting the error value (e.g., a distance value such as meters, etc.) for an obtained measurement and an apparatus supporting the same may be provided. According to various embodiments of the present disclosure, measurement quality information may be accurately and precisely known.

Various embodiments to be described in the following section are not in conflict with the above-described embodiments of the present disclosure. At least some embodiments from among the various embodiments of the present disclosure described in the following section may be combined with at least some of the various embodiments of the present disclosure described above, thereby constructing other embodiments of the present disclosure.

For example, if it is determined that the signaling overhead can be sufficiently handled in a wireless communication system, various embodiments to be described in this section may be considered more appropriate as compared to the above-described embodiments in terms of reduction in signaling overhead. In this case, although the signaling overhead is considered larger than those of various embodiments, the error value can be reported in the most accurate and precise manner.

For example, when the capability (capability) related to the signaling overhead of the wireless communication system is equal to or greater than a predetermined level, various embodiments of the present disclosure related to the absolute measurement quality described in this section may be more suitable. In this case, for example, the report on the relative measurement quality may be dropped.

For example, if the capability associated with the signaling overhead of a wireless communication system is less than a predetermined level, various embodiments of the present disclosure related to the relative measurement quality described above may be more suitable. In this case, for example, the report on absolute measurement quality may be dropped.

For example, the UE may receive configuration/instruction messages from the LMF/location server/BS so that the UE can report the absolute measurement value for a UE measurement (e.g., TOA/TOF/Rx-Rx time difference/RSTD/RSRP, etc.) obtained for UE positioning to the LMF/location server/BS.

At this time, for example, the measurement quality can be defined/reported as an error value (e.g., a distance value, for example, in meters, etc.) that may occur in the process of calculating/estimating the UE position.

At this time, for example, the UE can configure/instruct a confidence level/value for an error range from the LMF/location server/base station. That is, for example, one or more of the confidence of 80 percent, 85 percent, 90 percent, and 95 percent from among configurations for the measurement quality report may be configured/instructed in the UE. For example, the UE may calculate and/or report the measurement quality (e.g., the error range value, etc.) based on the above-described confidence.

For example, there may occur one case where the configured/instructed confidence is not guaranteed. For example, the UE may not obtain a measurement sample such that the configured/instructed confidence can be guaranteed. For example, the number of measurement samples (for UE measurement) obtained by the UE may be smaller than the number of measurement samples capable of guaranteeing the configured/instructed confidence. In this case, for example, the UE can report measurement quality and report the number of measurement samples used when evaluating/acquiring the measured quality. For example, the UE operation may be configured/instructed from the LMF/location server/base station.

For example, guaranteeing the configured/instructed confidence may indicate that the confidence of the measurement quality obtained by the UE satisfies the configured/instructed confidence (for example, a case in which the confidence of the measurement quality obtained by the UE is equal to or greater than the configured/instructed confidence).

For example, a situation in which the configured/instructed confidence is not guaranteed may indicate that the confidence of the measurement quality obtained by the UE is not satisfied (for example, the confidence of the measurement quality obtained by the UE is less than the configured/instructed confidence).

Taking the LPP as an example, an OTDOA-MeasQuality (which may indicate the quality for the TOA and/or RSTD measurement values used when the OTDOA technique is used) parameter may be configured as shown in Tables 8 and 9 below.

TABLE 8

OTDOA-MeasQuality

-- ASN1START
OTDOA-MeasQuality ::= SEQUENCE {
   error-Resolution           BIT STRING (SIZE (2)),
   error-Value                BIT STRING (SIZE (5)),
   error-NumSamples        BIT STRING (SIZE (3))
   OPTIONAL,
   ...
}
-- ASN1STOP

TABLE 9

OTDOA-MeasQuality field descriptions error-Resolution
This field specifies the resolution R used in error-Value field. The encoding on two bits is as follows:

| | |
|---|---|
| '00' | 5 meters |
| '01' | 10 meters |

TABLE 9-continued

OTDOA-MeasQuality field descriptions

| | |
|---|---|
| '10' | 20 meters |
| '11' | 30 meters. | error-Value
This field specifies the target device's beet estimate of the uncertainty of the OTDOA (or TOA) Measurement. The encoding on five bits is as follows:

| | | | |
|---|---|---|---|
| '00000' | 0 | to | (R*1-1) meters |
| '00001' | R*1 | to | (R*2-1) meters |
| '00010' | R*2 | to | (R*3-1) meters |
| ... | | | |
| '11111' | R*31 | | meters of more; | where R is the resolution defined by error-Resolution field.
E.g., R = 20 m corresponds to 0-19 m, 20-39 m, ..., 620 + m.

error-NumSamples
If the error-Value field provides the sample uncertainty of the OTDOA (or TOA) measurement, this field specifies how many measurements have been used by the target device to determine this (i.e., sample size).
Following 3 bit encoding is used

| | |
|---|---|
| '000' | Not the baseline metric |
| '001' | 5-9 |
| '010' | 10-14 |
| '011' | 15-24 |
| '100' | 25-34 |
| '101' | 35-44 |
| '110' | 45-54 |
| '111' | 55 or more. |

In case of the value '000', the error-Value field contains the target device's best estimate of the uncertainty of the OTDOA (or TOA) Measurement not based on the baseline metric. E.g.., other measurements such as signal-to-noise-ratio or signal strength can be utilized to estimate the error-Value.
If this field is absent, the value of this field is '000'

For example, in addition to error-resolution, error-value, and error-NumSamples included in OTDOA-MeasQuality, a parameter for the confidence level may be added.

For example, the parameters for the confidence may be configured as follows.

Confidence-level BIT string (size(2)): For example, the parameter for the confidence may be composed of a bit string having a size of 2 bits.

For example, a 2-bit string value may be used as follows.
00: 80% confidence level
01: 85% confidence level
10: 90% confidence level
11: 95% confidence level In summary, for example, a parameter for confidence may include one or more bits, and a value of one or more bits may correspond (be mapped) to one of a predetermined confidence (level). For example, one confidence from among the predetermined confidences may be instructed by a value of one or more bits.

And/or, for example, if a parameter for confidence is added, the error-NumSamples parameter may be excluded. For example, if the parameter for confidence is reported, the error—NumSamples parameter may not be reported. For example, if a parameter for confidence is included in 'OTDOA-MeasQuality', the error-NumSamples parameter may not be included in 'OTDOA-MeasQuality'.

One example of the method for operating the UE according to various embodiments of the present disclosure will hereinafter be described with reference to FIG. 16.

Referring to FIG. 16, in operation 1601 according to an exemplary embodiment, the UE may receive the RS (e.g., PRS, etc.) related to a positioning measurement. For example, the UE may receive the RS for obtaining a measurement for UE positioning from the LMF/location server/base station.

In operation 1603 according to an exemplary embodiment, the UE may receive a reporting configuration related to the positioning measurement report. For example, the UE may receive a configuration/instruction indicating that reports measurements/acquired from the LMF/the location server/the base station. For example, the UE may be instructed to report a measurement according to one or more of the proposal #3 to proposal #6.

In particular, for example, when the UE receives a configuration/instruction required for measurement reporting, the UE may receive the configuration/instruction that reports the absolute measurement quality for the measured/obtained measurement in the same manner as in various embodiments of the present disclosure described in the proposal #6 and the like. For example, the UE may receive configuration/instruction messages related to the confidence of the measurement quality from the LMF/location server/BS. For example, the UE may receive information about confidence for the measurement quality from the LMF/location server/BS, so that the received information can be configured/instructed in the UE.

In operation 1605 according to an exemplary embodiment, the UE may receive the RS. For example, the RS may be received based on the RS configuration.

In operation 1607 according to an exemplary embodiment, the UE may perform measurement using the RS, may acquire such measurement, and/or may obtain the measurement quality (e.g., absolute measurement quality). For example, the measurement and/or measurement quality acquired by the UE may be based on the reporting configuration.

In operation 1609 according to an exemplary embodiment, the UE may report the measurement quality. For example, the UE may report information about the determined absolute measurement quality to the LMF/location server/base station. For example, if the instructed/configured confidence is not guaranteed, the UE can report the number of measurement samples from which the measurement quality value can be derived, as well as the information about the measurement quality.

More specific operations of the UE according to various embodiments of the present disclosure can be described and performed based on the proposals #3 to #6 described above.

Each operation of the UE according to various embodiments of the present disclosure can be performed simultaneously and/or independently. Also, for example, some or all of the order of each operation of the UE may be changed and/or at least a portion of the order of each operation of the UE may be omitted as necessary.

FIG. 17 is a flowchart illustrating a method for operating the network node according to various embodiments of the present disclosure. For example, the network node may be the location server, the LMF, the TP, and/or any device performing the same task.

Referring to FIG. 17, in operation 1701 according to an exemplary embodiment, the network node may transmit the RS (e.g., PRS, etc.) related to such positioning measurement. For example, the network node may configure, in the UE, the RS for obtaining a measurement for UE positioning.

In operation 1703 according to an exemplary embodiment, the network node may transmit a reporting configuration related to the positioning measurement report. For example, the network node may be configured/instructed to report the measured/obtained measurement to the UE. For example, when the network node performs configuration/instruction for reporting such measurement, the network node may perform the configuration/instruction required for reporting the measurement quality about the measured/obtained measurement. For example, the network node may be instructed to report measurement of at least one of the proposals #3 to #6.

In particular, for example, when the network node performs the configuration/instruction required for reporting such measurement, the network node may perform the configuration/instruction to report the absolute measurement quality for the measured/obtained measurement in the same manner as in various embodiments described in the proposal #6. For example, the confidence for the measurement quality may be configured/instructed in the UE by the LMF/location server/base station.

In operation 1705 according to an exemplary embodiment, the network node may transmit the RS. For example, the RS may be transmitted based on the RS configuration.

In operation 1707 according to an exemplary embodiment, the network node may receive the measurement quality report. For example, the measurement quality information may be based on such reporting configuration.

More specific operations of the network node according to various embodiments of the present disclosure can be described and performed based on the proposals #0 to #2-1 described above.

Each operation of the network node according to various embodiments of the present disclosure can be performed simultaneously and/or independently. Also, for example, some or all of the order of each operation of the network node may be changed and/or at least a portion of the order of each operation of the network node may be omitted. For example, if the network node is the LMF/location server, the operation of transmitting the RS may be omitted.

Figure 18:
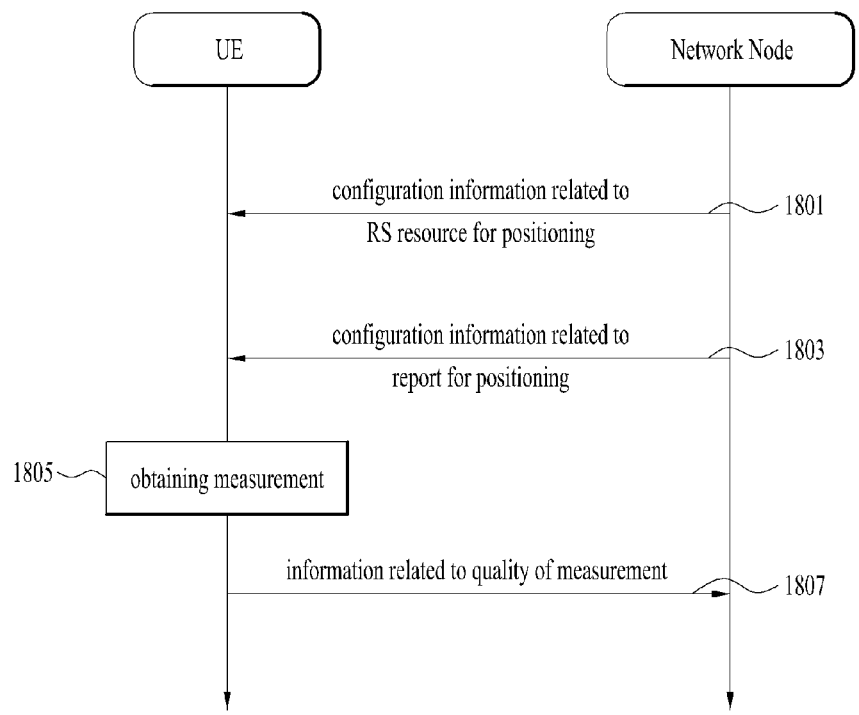
FIG. 18 is a diagram illustrating a method for operating the UE and network nodes according to various embodiments of the present disclosure.

FIG. 18 is a diagram illustrating a method for operating the UE and network nodes according to various embodiments of the present disclosure.

Figure 19:
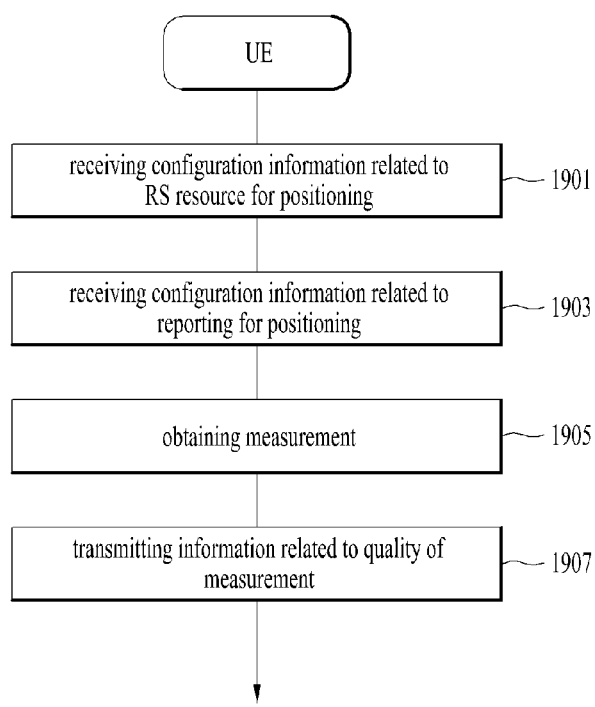
FIG. 19 is a flowchart illustrating a method for operating the UE according to various embodiments of the present disclosure.

FIG. 19 is a flowchart illustrating a method for operating the UE according to various embodiments of the present disclosure.

Figure 20:
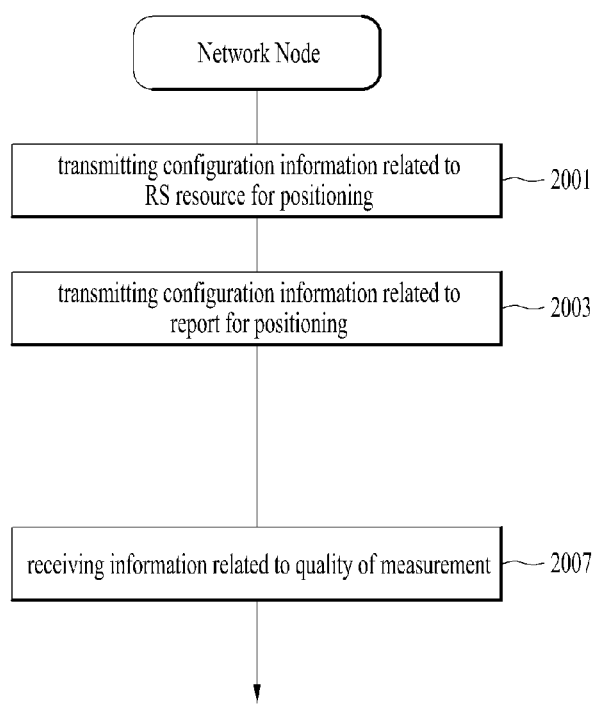
FIG. 20 is a flowchart illustrating a method for operating a network node according to various embodiments of the present disclosure.

FIG. 20 is a flowchart illustrating a method for operating the network node according to various embodiments of the present disclosure. For example, the network node may be the location server, the LMF, the TP, and/or any device that performs the same task.

Referring to FIGS. 18 to 20, in operations 1801, 1901, and 2001 according to an exemplary embodiment, the network node can transmit configuration information related to the RS resource for positioning, and the UE can receive the configuration information.

In operations 1803, 1903, and 2003 according to an exemplary embodiment, the network node can transmit configuration information related to a report for positioning, and the UE can receive the configuration information.

In operations 1805 and 1905 according to an exemplary embodiment, the UE can obtain a measurement. For example, the measurement may be obtained based on configuration information associated with RS resources for positioning.

In operations 1807, 1907, 2007 according to an exemplary embodiment, the UE may transmit information related to the measurement quality, and the network node may receive the corresponding information. For example, information related to the measurement quality may be transmitted based on configuration information related to a report for positioning.

For example, configuration information related to the report for positioning may include information required to configure confidence for the quality.

More specific operations of the UE and/or the TP and/or the location server according to the above-described various embodiments of the present disclosure may be described and performed based on the descriptions of clause 1 to clause 3.

Examples of the above-described proposed methods may also be included as one of various embodiments of the present disclosure, and thus may be considered to be some proposed methods. While the proposed methods may be independently implemented, some of the proposed methods may be combined (or merged). It may be regulated that information indicating whether to apply the proposed methods (or information about the rules of the proposed methods) is indicated by a signal (e.g., a physical-layer signal or a higher-layer signal) predefined for the UE by the BS.

4. Exemplary Configurations of Devices Implementing Various Embodiments of the Present Disclosure 4.1. Exemplary Configurations of Devices to which Various Embodiments of the Present Disclosure are Applied FIG. 21 is a diagram illustrating devices that implement various embodiments of the present disclosure.

Figure 21:
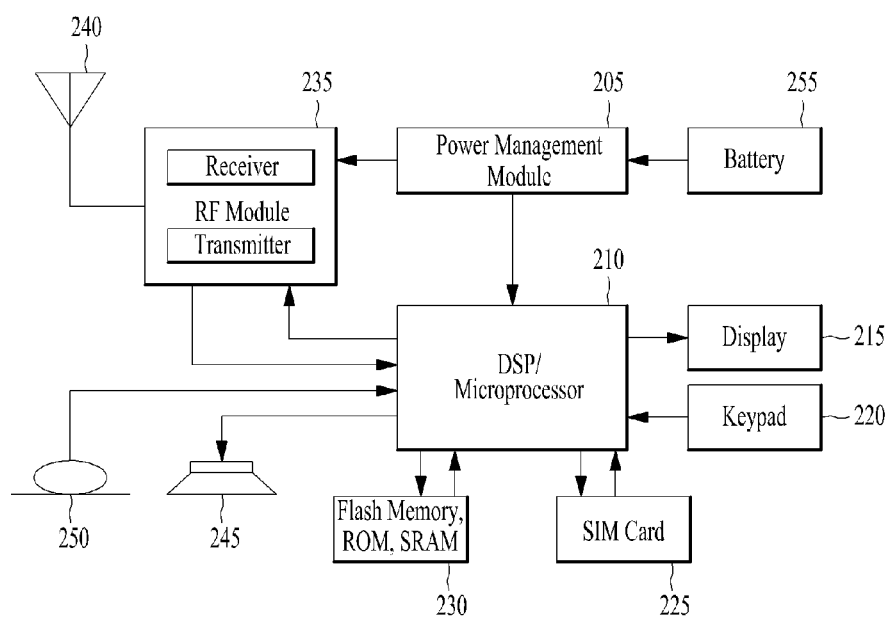
FIG. 21 illustrates an exemplary communication system to which various embodiments of the present disclosure are applied.

The devices illustrated in FIG. 21 may be a UE and/or a BS (e.g., eNB or gNB) adapted to perform the afore-described mechanisms, or any devices performing the same operation.

Referring to FIG. 21, the device may include a digital signal processor (DSP)/microprocessor 210 and a radio frequency (RF) module (transceiver) 235. The DSP/microprocessor 210 is electrically coupled to the transceiver 235 and controls the transceiver 235. The device may further include a power management module 205, a battery 255, a display 215, a keypad 220, a SIM card 225, a memory device 230, an antenna 240, a speaker 245, and an input device 250, depending on a designer's selection.

Particularly, FIG. 21 may illustrate a UE including a receiver 235 configured to receive a request message from a network and a transmitter 235 configured to transmit timing transmission/reception timing information to the network. These receiver and transmitter may form the transceiver 235. The UE may further include a processor 210 coupled to the transceiver 235.

Further, FIG. 21 may illustrate a network device including a transmitter 235 configured to transmit a request message to a UE and a receiver 235 configured to receive timing transmission/reception timing information from the UE. These transmitter and receiver may form the transceiver 235. The network may further include the processor 210 coupled to the transceiver 235. The processor 210 may calculate latency based on the transmission/reception timing information.

A processor included in a UE (or a communication device included in the UE) and a BE (or a communication device included in the BS) according to various embodiments of the present disclosure may operate as follows, while controlling a memory.

According to various embodiments of the present disclosure, a UE or a BS may include at least one transceiver, at least one memory, and at least one processor coupled to the at least one transceiver and the at least one memory. The at least one memory may store instructions causing the at least one processor to perform the following operations.

A communication device included in the UE or the BS may be configured to include the at least one processor and the at least one memory. The communication device may be configured to include the at least one transceiver, or may be configured not to include the at least one transceiver but to be connected to the at least one transceiver.

The location server, the LMF, the base station, and/or any device performing the same task may be referred to as a network node.

According to various embodiments of the present disclosure, one or more processors included in the UE (or one or more processors of a communication device included in the UE) may receive first configuration information related to a reference signal (RS) resource for positioning.

According to various embodiments of the present disclosure, one or more processors included in the UE may receive second configuration information related to a report for positioning.

According to various embodiments of the present disclosure, one or more processors included in the UE can obtain measurement for the positioning based on the first configuration information.

According to various embodiments of the present disclosure, one or more processors included in the UE may transmit information related to quality of the measurement based on the second configuration information.

In an exemplary embodiment, the second configuration information may include information for configuring the confidence of the quality.

According to various embodiments of the present disclosure, one or more processors included in the network node (or one or more processors of a communication device included in the network node) may transmit first configuration information related to the reference signal (RS) resource for positioning.

According to various embodiments of the present disclosure, one or more processors included in the network node may receive second configuration information related to a report for the positioning.

According to various embodiments of the present disclosure, one or more processors included in the network node may receive information related to quality of the measurement corresponding to the second configuration information.

In an exemplary embodiment, the second configuration information may include information required for setting the confidence for the quality.

More specific operations of the processor included in the UE and/or the BS and/or the location server according to the above-described various embodiments of the present disclosure may be described and performed based on the descriptions of clause 1 to clause 3.

Unless contradicting each other, various embodiments of the present disclosure may be implemented in combination. For example, (a processor or the like included in) a UE and/or a BS and/or a location server according to various embodiments of the present disclosure may implement the embodiments described in clause 1 to clause 3 in combination, unless contradicting each other.

4.2. Example of Communication System to which Various Embodiments of the Present Disclosure are Applied In the present specification, various embodiments of the present disclosure have been mainly described in relation to data transmission and reception between a BS and a UE in a wireless communication system. However, various embodiments of the present disclosure are not limited thereto. For example, various embodiments of the present disclosure may also relate to the following technical configurations.

The various descriptions, functions, procedures, proposals, methods, and/or operational flowcharts of the various embodiments of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

FIG. 21 illustrates an exemplary communication system to which various embodiments of the present disclosure are applied.

Referring to FIG. 21, a communication system 1 applied to the various embodiments of the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the various embodiments of the present disclosure.

Figure 22:
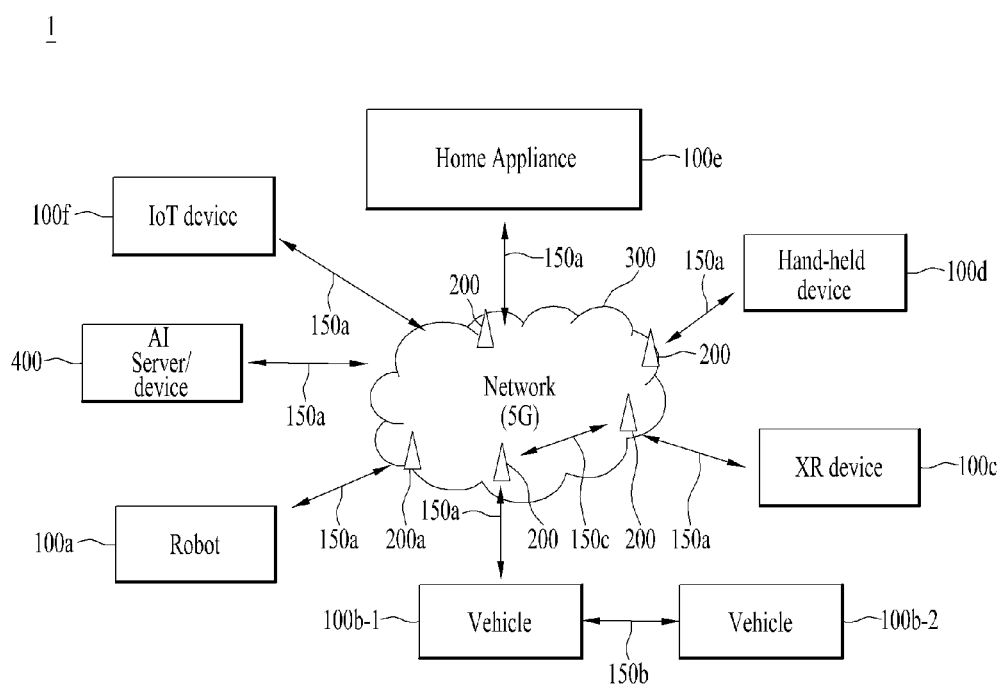
FIG. 22 illustrates exemplary wireless devices to which various embodiments of the present disclosure are applicable.

4.2.1 Example of Wireless Devices to which Various Embodiments of the Present Disclosure are Applied FIG. 22 illustrates exemplary wireless devices to which various embodiments of the present disclosure are applicable.

Referring to FIG. 22, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. W1.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the various embodiments of the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the various embodiments of the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

According to various embodiments of the present disclosure, one or more memories (e.g., 104 or 204) may store instructions or programs which, when executed, cause one or more processors operably coupled to the one or more memories to perform operations according to various embodiments or implementations of the present disclosure.

According to various embodiments of the present disclosure, a computer-readable storage medium may store one or more instructions or computer programs which, when executed by one or more processors, cause the one or more processors to perform operations according to various embodiments or implementations of the present disclosure.

According to various embodiments of the present disclosure, a processing device or apparatus may include one or more processors and one or more computer memories connected to the one or more processors. The one or more computer memories may store instructions or programs which, when executed, cause the one or more processors operably coupled to the one or more memories to perform operations according to various embodiments or implementations of the present disclosure.

Figure 23:
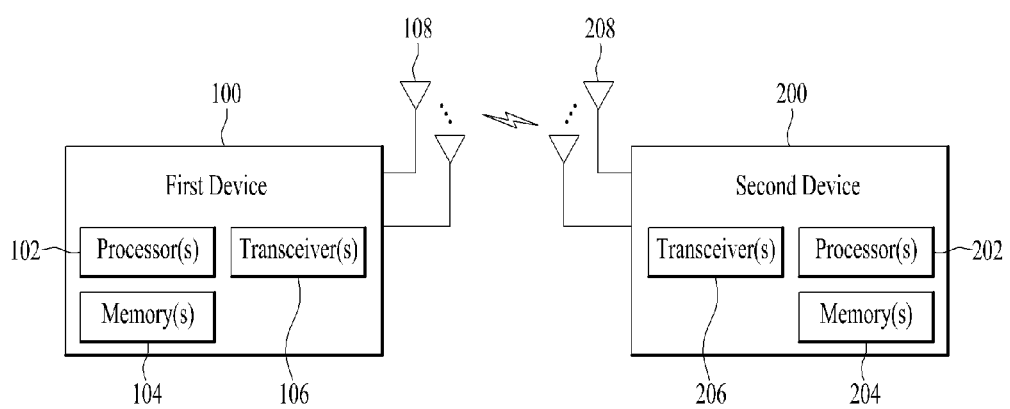
FIG. 23 illustrates other exemplary wireless devices to which various embodiments of the present disclosure are applied.

4.2.2. Example of Using Wireless Devices to which Various Embodiments of the Present Disclosure are Applied FIG. 23 illustrates other exemplary wireless devices to which various embodiments of the present disclosure are applied. The wireless devices may be implemented in various forms according to a use case/service (see FIG. 21).

Referring to FIG. 23, wireless devices 100 and 200 may correspond to the wireless devices 100 and 200 of FIG. 21 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 21. For example, the transceiver(s) 114 may include the one or more transceivers 106 and 206 and/or the one or more antennas 108 and 208 of FIG. 21. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. W1), the vehicles (100b-1 and 100b-2 of FIG. W1), the XR device (100c of FIG. W1), the hand-held device (100d of FIG. W1), the home appliance (100e of FIG. W1), the IoT device (100f of FIG. W1), a digital broadcast terminal, a hologram device, a public safety device, an MTC device, a medicine device, a fintech device (or a finance device), a security device, a climate/environment device, the AI server/device (400 of FIG. W1), the BSs (200 of FIG. W1), a network node, etc. The wireless device may be used in a mobile or fixed place according to a use-example/service.

In FIG. 23, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 23 will be described in detail with reference to the drawings.

Figure 24:
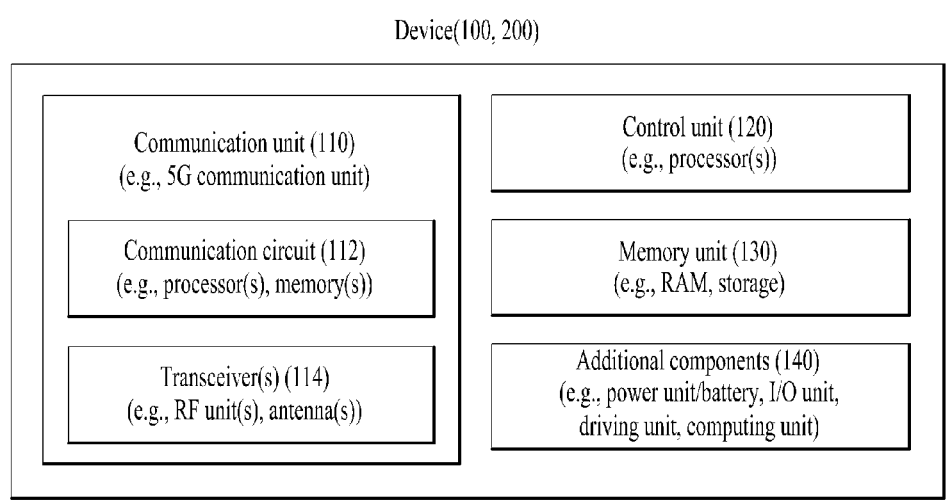
FIG. 24 illustrates an exemplary portable device to which various embodiments of the present disclosure are applied.

4.2.3. Example of Portable Device to which Various Embodiments of the Present Disclosure are Applied FIG. 24 illustrates an exemplary portable device to which various embodiments of the present disclosure are applied. The portable device may be any of a smartphone, a smartpad, a wearable device (e.g., a smartwatch or smart glasses), and a portable computer (e.g., a laptop). A portable device may also be referred to as mobile station (MS), user terminal (UT), mobile subscriber station (MSS), subscriber station (SS), advanced mobile station (AMS), or wireless terminal (WT).

Referring to FIG. 24, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. X3, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

4.2.4. Example of Vehicle or Autonomous Driving Vehicle to which Various Embodiments of the Present Disclosure.

Figure 25:
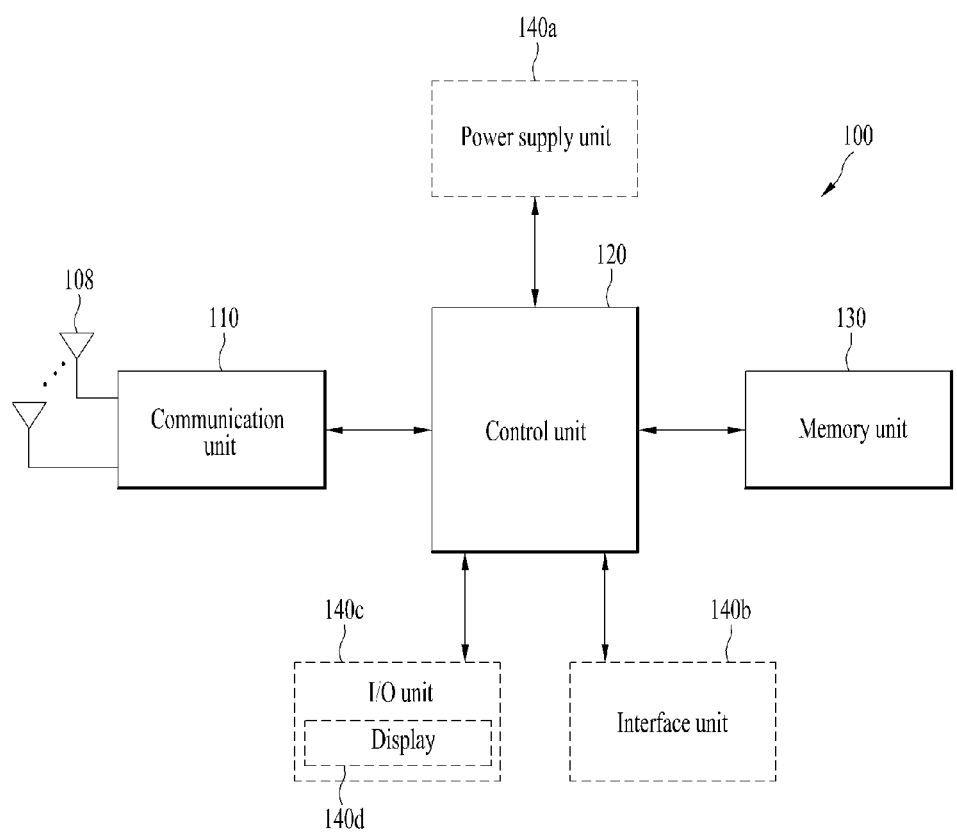
FIG. 25 illustrates an exemplary vehicle or autonomous driving vehicle to which various embodiments of the present disclosure.
Figure 26:
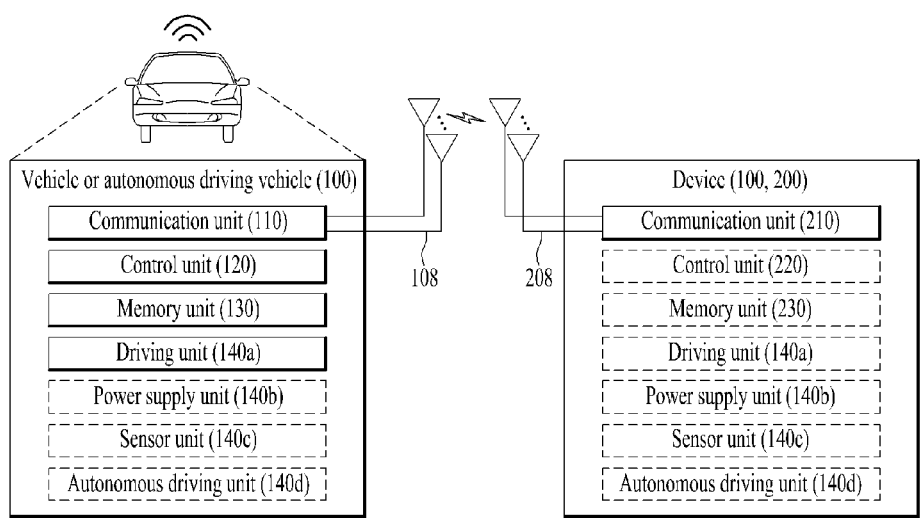
FIG. 26 illustrates an exemplary vehicle to which various embodiments of the present disclosure are applied.

FIG. 25 illustrates an exemplary vehicle or autonomous driving vehicle to which various embodiments of the present disclosure. The vehicle or autonomous driving vehicle may be implemented as a mobile robot, a car, a train, a manned/unmanned aerial vehicle (AV), a ship, or the like.

Referring to FIG. 25, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. X3, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an Electronic Control Unit (ECU). The driving unit 140a may cause the vehicle or the autonomous driving vehicle 100 to drive on a road. The driving unit 140a may include an engine, a motor, a powertrain, a wheel, a brake, a steering device, etc. The power supply unit 140b may supply power to the vehicle or the autonomous driving vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

In summary, various embodiments of the present disclosure may be implemented through a certain device and/or UE.

For example, the certain device may be any of a BS, a network node, a transmitting UE, a receiving UE, a wireless device, a wireless communication device, a vehicle, a vehicle equipped with an autonomous driving function, an unmanned aerial vehicle (UAV), an artificial intelligence (AI) module, a robot, an augmented reality (AR) device, a virtual reality (VR) device, and other devices.

For example, a UE may be any of a personal digital assistant (PDA), a cellular phone, a personal communication service (PCS) phone, a global system for mobile (GSM) phone, a wideband CDMA (WCDMA) phone, a mobile broadband system (MBS) phone, a smartphone, and a multi mode-multi band (MM-MB) terminal.

A smartphone refers to a terminal taking the advantages of both a mobile communication terminal and a PDA, which is achieved by integrating a data communication function being the function of a PDA, such as scheduling, fax transmission and reception, and Internet connection in a mobile communication terminal. Further, an MM-MB terminal refers to a terminal which has a built-in multi-modem chip and thus is operable in all of a portable Internet system and other mobile communication system (e.g., CDMA 2000, WCDMA, and so on).

Alternatively, the UE may be any of a laptop PC, a hand-held PC, a tablet PC, an ultrabook, a slate PC, a digital broadcasting terminal, a portable multimedia player (PMP), a navigator, and a wearable device such as a smartwatch, smart glasses, and a head mounted display (HMD). For example, a UAV may be an unmanned aerial vehicle that flies under the control of a wireless control signal. For example, an HMD may be a display device worn around the head. For example, the HMD may be used to implement AR or VR.

Here, wireless communication technologies implemented in the wireless devices of the present specification may include LTE, NR, and 6G, as well as Narrowband Internet of Things (NB-IoT) for low power communication. At this time, for example, the NB-IoT technology may be an example of a Low Power Wide Area Network (LPWAN) technology, and may be implemented in standards such as LTE Cat NB1 and/or LTE Cat NB2, and is not limited to the above-described names. Additionally or alternatively, the wireless communication technology implemented in the wireless devices (XXX, YYY) of the present specification may perform communication based on LTE-M technology. In this case, as an example, the LTE-M technology may be an example of LPWAN technology, and may be referred to by various names such as eMTC (enhanced machine type communication). For example, LTE-M technology may be implemented in at least one of a variety of standards, such as 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M, and is not limited to the above-described names. Additionally or alternatively, the wireless communication technology implemented in the wireless devices (XXX, YYY) of the present specification is at least one of ZigBee, Bluetooth, and Low Power Wide Area Network (LPWAN) considering low power communication, and is not limited to the above-described names. As an example, ZigBee technology can generate personal area networks (PANs) related to small/low-power digital communication based on various standards such as IEEE 802.15.4, and may be called various names.

Various embodiments of the present disclosure may be implemented in various means. For example, various embodiments of the present disclosure may be implemented in hardware, firmware, software, or a combination thereof.

In a hardware configuration, the methods according to exemplary embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the various embodiments of the present disclosure may be implemented in the form of a module, a procedure, a function, etc. performing the above-described functions or operations. A software code may be stored in the memory 50 or 150 and executed by the processor 40 or 140. The memory is located at the interior or exterior of the processor and may transmit and receive data to and from the processor via various known means.

Those skilled in the art will appreciate that the various embodiments of the present disclosure may be carried out in other specific ways than those set forth herein without departing from the spirit and essential characteristics of the various embodiments of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

INDUSTRIAL APPLICABILITY

The various embodiments of present disclosure are applicable to various wireless access systems including a 3GPP system, and/or a 3GPP2 system. Besides these wireless access systems, the various embodiments of the present disclosure are applicable to all technical fields in which the wireless access systems find their applications. Moreover, the proposed method can also be applied to mmWave communication using an ultra-high frequency band.

The invention claimed is:

1. A method performed by a user equipment (UE) comprising:
   receiving first configuration information related to a reference signal (RS) resource for positioning;
   receiving second configuration information including information configuring a report of measurements for the positioning,
   wherein the second configuration information further includes confidence information;
   acquiring a measurement for the positioning based on the first configuration information,
   wherein the measurement includes reference signal time differences (RSTDs) for a first number of samples;
   transmitting measurement information including the measurement including the RSTDs; and
   transmitting quality information including information related to a quality of the measurement based on the second configuration information,
   wherein the UE determines whether to further include information for the first number of samples in the quality information based on whether the first number is less than a threshold sample number determined by the confidence information, and
   wherein, based on the first number being less than the threshold sample number, the quality information further includes the information for the first number.

2. The method according to claim 1, wherein:
   the confidence information in the second information includes at least one bit;
   one of a plurality of predetermined confidences is instructed based on the at least one bit;
   the at least one bit having a first value is mapped to a first confidence from among the plurality of predetermined confidences; and
   the at least one bit having a second value is mapped to a second confidence from among the plurality of predetermined confidences.

3. The method according to claim 1, wherein the confidence information in the second information includes:
   a bit string having a size of 2 bits,
   wherein
   the bit string having a value of '00' is mapped to a confidence of 80 percent,
   the bit string having a value of '01' is mapped to a confidence of 85 percent,
   the bit string having a value of '10' is mapped to a confidence of 90 percent, and
   the bit string having a value of '11' is mapped to a confidence of 95 percent.

4. The method according to claim 1, wherein:
   the quality of the measurement is an absolute quality of the measurement, and
   the method further includes:
   based on a state in which capability related to signaling overhead of the wireless communication system is less than a predetermined level,
   (i) transmitting information related to a relative quality of the measurement based on the second configuration information; and
   (ii) dropping transmission of information related to the absolute quality of the measurement.

5. The method according to claim 1, wherein the information related to the relative quality of the measurement further includes at least one of:
  (i) information about an average quality of a plurality of measurements that are obtained from a plurality of transmission points (TPs), a plurality of reference signal (RS) resource sets, or a plurality of RS resources;
  (ii) information about an identifier (ID) of the transmission point (TP), an ID of the RS resource set, or an ID of the RS resource, which correspond to a measurement having an upper X percent or an upper Y percent from among the plurality of measurements obtained from the plurality of TPs, the plurality of RS resource sets, or the plurality of RS resources; or
  (iii) information about IDs of the plurality of TPs, IDs of the plurality of RS resource sets, and IDs of the plurality of RS resources, that are sequentially arranged in a range from an ID of the transmission point (TP), an ID of the RS resource set, and an ID of the RS resource, each of which corresponds to a measurement having a best quality from among the plurality of measurements obtained from the plurality of TPs, the plurality of RS resource sets, or the plurality of RS resources, to an ID of the transmission point (TP), an ID of the RS resource set, and an ID of the RS resource, each of which corresponds to a measurement having a worst quality from among the plurality of obtained measurements,
  wherein X is a natural number, and Y is a real number.

6. An apparatus operating in a wireless communication system comprising:
  a memory; and
  at least one processor connected to the memory,
  wherein the at least one processor is configured to:
  receive first configuration information related to a reference signal (RS) resource for positioning;
  receive second configuration information including information configuring a report of measurements for the positioning,
  wherein the second configuration information further includes confidence information;
  acquire a measurement for the positioning based on the first configuration information,
  wherein the measurement includes reference signal time differences (RSTDs) for a first number of samples;
  transmit measurement information including the measurement including the RSTDs; and
  transmit quality information including information related to a quality of the measurement based on the second configuration information,
  wherein the UE determines whether to further include information for the first number of samples in the quality information based on whether the first number is less than a threshold sample number determined by the confidence information, and
  wherein, based on the first number being less than the threshold sample number, the quality information further includes the information for the first number.

7. The apparatus according to claim 6, wherein:
  the confidence information in the second information includes at least one bit;
  one of a plurality of predetermined confidences is instructed based on the at least one bit;
  the at least one bit having a first value is mapped to a first confidence from among the plurality of predetermined confidences; and
  the at least one bit having a second value is mapped to a second confidence from among the plurality of predetermined confidences.

8. The apparatus according to claim 6, wherein the confidence information in the second information includes:
  a bit string having a size of 2 bits,
  wherein
  the bit string having a value of '00' is mapped to a confidence of 80 percent,
  the bit string having a value of '01' is mapped to a confidence of 85 percent,
  the bit string having a value of '10' is mapped to a confidence of 90 percent, and
  the bit string having a value of '11' is mapped to a confidence of 95 percent.

9. An apparatus operating in a wireless communication system comprising:
  at least one processor; and
  at least one memory configured to store instructions such that the at least one processor performs specific operations by executing the instructions,
  wherein the specific operations include:
  receiving first configuration information related to a reference signal (RS) resource for positioning;
  receiving second configuration information including information configuring a report of measurements for the positioning,
  wherein the second configuration information further includes confidence information;
  acquiring a measurement for the positioning based on the first configuration information,
  wherein the measurement includes reference signal time differences (RSTDs) for a first number of samples;
  transmitting measurement information including the measurement including the RSTDs; and
  transmitting quality information including information related to a quality of the measurement based on the second configuration information,
  wherein the UE determines whether to further include information for the first number of samples in the quality information based on whether the first number is less than a threshold sample number determined by the confidence information, and
  wherein, based on the first number being less than the threshold sample number, the quality information further includes the information for the first number.

10. A non-transitory computer-readable medium containing instructions for causing a processor to perform the method according to claim 1.

* * * * *